(12) United States Patent
Cherpantier

(10) Patent No.: US 7,945,792 B2
(45) Date of Patent: May 17, 2011

(54) TAMPER REACTIVE MEMORY DEVICE TO SECURE DATA FROM TAMPER ATTACKS

(75) Inventor: Fredric Cherpantier, Rueil Malmaison (FR)

(73) Assignee: Spansion LLC, Sunnyvale, CA (US)

( * ) Notice: Subject to any disclaimer, the term of this patent is extended or adjusted under 35 U.S.C. 154(b) by 850 days.

(21) Appl. No.: 11/873,980

(22) Filed: Oct. 17, 2007

(65) Prior Publication Data

US 2009/0106563 A1   Apr. 23, 2009

(51) Int. Cl.
*H04L 9/32* (2006.01)
*G06F 12/14* (2006.01)
*G11C 11/22* (2006.01)

(52) U.S. Cl. .................. 713/194; 713/174; 365/145

(58) Field of Classification Search .............. None
See application file for complete search history.

(56) References Cited

U.S. PATENT DOCUMENTS

| | | | |
|---|---|---|---|
| 2002/0169960 A1* | 11/2002 | Iguchi et al. ............ | 713/174 |
| 2006/0023486 A1* | 2/2006 | Furusawa et al. ........ | 365/145 |

FOREIGN PATENT DOCUMENTS

| | | |
|---|---|---|
| EP | 1837837 A | 9/2007 |
| WO | 0163994 A | 8/2001 |

OTHER PUBLICATIONS

International Search Report & Written Opinion dated Dec. 29, 2008 for PCT Application Serial No. PCT/US2008/080317, 12 Pages.

\* cited by examiner

*Primary Examiner* — Shin-Hon Chen
(74) *Attorney, Agent, or Firm* — Turocy & Watson, LLP

(57) ABSTRACT

Systems and methods that can facilitate securing data associated with a memory from tampering are presented. A counter tamper component can detect tamper attacks or tamper attempts associated with a memory and/or data stored therein or associated therewith and reacts to such tamper attacks/attempts, as the counter tamper component can provide evidence of, provide a response to, and/or resist tamper attacks/attempts. The counter tamper component can be associated with a memory module that includes a memory device (s) module and is contained in an electronic device and the memory module can change a color state to provide evidence of tampering. A window component is positioned on the casing of the electronic device so that the memory module is visible to the user so the user can perceive that a tamper attack associated with the module has occurred.

26 Claims, 14 Drawing Sheets

TAMPER REACTIVE MEMORY DEVICE TO SECURE DATA FROM TAMPER ATTACKS

BACKGROUND

A wide variety of memory devices can be used to maintain and store data and instructions for various computers and similar systems. In particular, flash memory is a type of electronic memory media that can be rewritten and retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash and/or NAND flash, for example. NOR flash evolved from electrically erasable read only memory (EEPROM) chip technology, in which, unlike flash, a single byte can be erased; and NAND flash evolved from DRAM technology. Flash memory devices can be less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is non-volatile; it can be rewritten and can hold its content without power. It can be used in many portable electronic products, such as cellular phones, computers, voice recorders, thumbnail drives, and the like, as well as in many larger electronic systems, such as automobiles, airplanes, industrial control systems, etc. The fact that flash memory can be rewritten as well as its retention of data without a power source, small size and light weight have all combined to make flash memory devices a useful and popular means for transporting and maintaining data.

Non-volatile memory, such as flash memory, can be used to store sensitive and/or personal information associated with a user, such as, bank account information, personal identification numbers, photographs, legal documents, etc. Other entities can attempt to gain access to such data stored in the memory, which can result in hardship (e.g., financial, personal, professional, etc.) to the user. It is desirable to maintain data in a memory device in a secure manner. It is also desirable to enable the user to learn of attempts to gain unauthorized access to the memory device by unauthorized entities.

SUMMARY

The following presents a simplified summary of the subject innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The subject innovation relates to systems and/or methods that can facilitate securing data in a memory device from attempts to tamper with the memory device and/or data stored therein or associated therewith. A counter tamper component can monitor events associated with the casing containing a memory device and/or accessing information associated with the memory device and can react (e.g., respond, resist, and/or provide evidence) to attempts to tamper (e.g., tamper events, tamper attacks) with the casing and/or the data stored in the memory. The counter tamper component can evaluate information associated with the casing and/or data stored in the memory and can determine whether a tamper event is or has occurred. Based on the type of tamper event, the counter tamper component can provide evidence of the tamper event to enable the user (e.g., owner) of the memory device to learn of the tamper event, provide a response to the tamper event, and/or can resist the tamper event.

In accordance with one aspect, a memory device can be contained in a memory casing (e.g., memory module), which can be included within an electronic device casing where the electronic device can be a cellular phone, personal digital assistant (PDA), or smart card, for example. The counter tamper component can be included within the memory module and can be associated with the module and the memory device. The counter tamper component can provide evidence that an entity has tampered with the memory device by attempting to access data securely stored in the memory device. In one aspect, the counter tamper component can receive information that a predetermined number of unsuccessful attempts have been made to access data secured in the memory, and can determine that a tampering event has occurred as a result. For example, the counter tamper component can receive information that an entity has attempted to authenticate a predetermined number of times (e.g., three times) in order to access the memory device, and all attempts were unsuccessful due to improper authentication information being provided by the entity. The counter tamper component can provide evidence that such tamper event has occurred, for example, by changing the color of the memory module that contains the memory device and/or illuminating a light emitting diode(s) (LED(s)) that can be on or associated with the module. As the memory module can be contained within the electronic device, to enable the evidence of tampering to be perceived by the user, the electronic device can be constructed so that there can be a window or other transparent component that can be positioned on the casing of the electronic device so that the user can see the memory module casing within the electronic device in order to observe the evidence of tampering (e.g., change of color state of the memory module). In one aspect, the casing of the memory module can be designed to be aesthetically desirable to users.

In another aspect, where an entity attempts to physically access the memory module or memory device within, such as by attempting to open the memory casing, the casing and/or the memory device contained therein can be formed of a material such that the casing and/or memory device can fracture and/or break into multiple pieces, such that the memory device can be rendered unusable, or virtually unusable, and the data therein can be rendered inaccessible, or virtually inaccessible.

In still another aspect, the counter tamper component can provide a response to a tamper event. During an attempt to open the memory casing, disruption of the casing can cause an associated switch to be thrown resulting in a change to the circuit (e.g. opening of circuit, closing of circuit) which can be detected by the counter tamper component. The counter tamper component can respond to the attack by erasing of all or a subset of partitions of the memory device and data stored within such partitions. In another aspect, the counter tamper component can respond to an attack by initiating catastrophic or graceful failure of one or more components of the memory device. Counter tamper responses can be performed with the use of ancillary circuitry and a power source that can be contained within the memory casing.

In another aspect the memory device can be incorporated in to a "mesh" encompassing the memory module and one or more paths on the printed circuit board (PCB), connecting one or more pins on the memory module. An electronic signal can be passed across the "mesh" via the pins of the memory module. During an attempt to remove and/or desolder the memory module from the PCB the disruption and/or disconnection of the signal can be detected by the counter tamper component, and the counter tamper component can generate a desired response (e.g., erasing data, causing catastrophic failure of components) to the attack accordingly.

In yet another aspect, the counter tamper component can provide resistance to a tamper event. Attacks can be conducted in order to obtain information associated with electromagnetic and/or radio frequency that can be output from the memory device in order determine information such as cryptographic information (e.g., exponent, cryptographic protocol) associated with the memory device in order to gain access to the memory and/or the content stored therein. The counter tamper component can include a shielding that can be employed in the memory casing to facilitate resisting such attacks, as the shielding can reduce or eliminate the emanation of electromagnetic radiation and/or radio frequency information from the memory device, and can thereby reduce the risk of attacks based on such electromagnetic radiation and/or radio frequency information.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and novel features of the disclosed subject matter will become apparent from the following detailed description of the innovation when considered in conjunction with the drawings.

DETAILED DESCRIPTION

Figure 1:
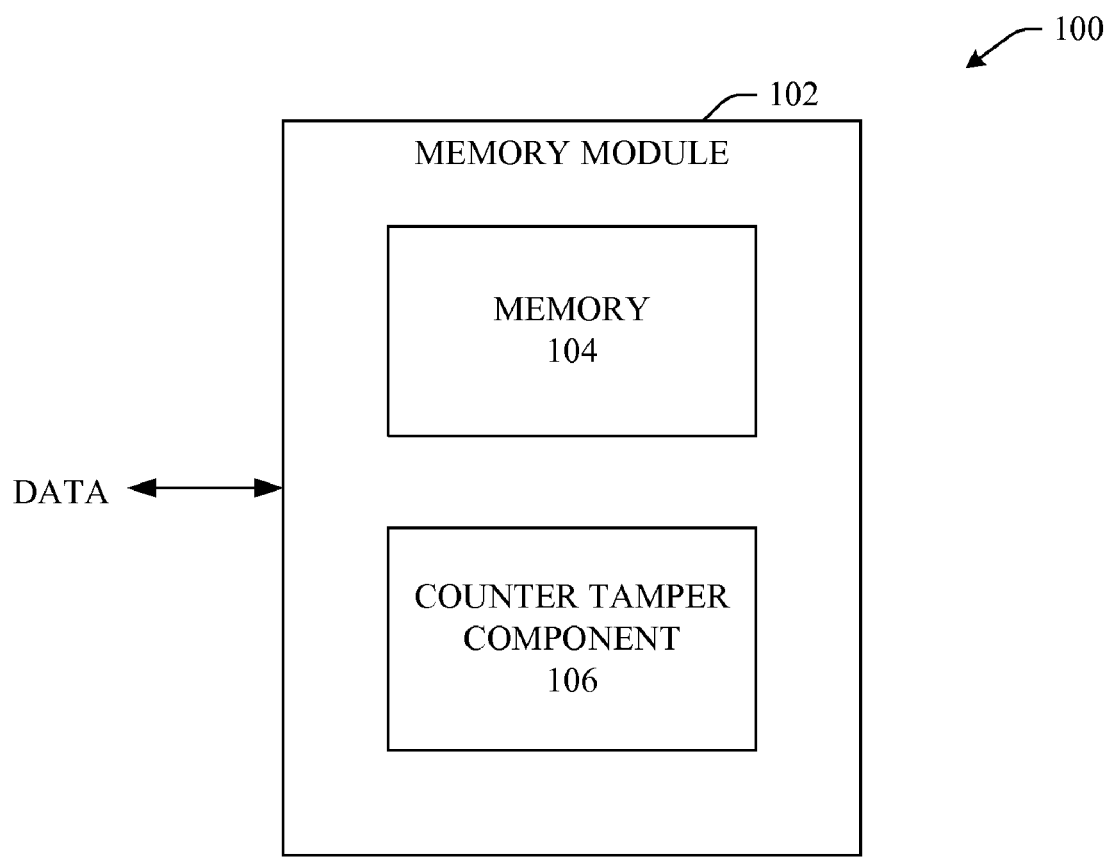
FIG. 1 illustrates a system that secures data from tampering in accordance with an aspect of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Flash memory devices are finding use in many applications where advantage can be taken of the relatively small size, high memory density, and portability as well as the capability of retaining data stored therein without power. Flash memory devices can be used to store data that the user desires to be secure and/or private such that others cannot access data. A flash memory device can often be used in an electronic device (e.g., cellular phone, personal digital assistant (PDA) etc.), where personal data and/or other sensitive data can be stored in the flash memory device. Conventionally, the flash memory device is situated within the electronic device such that the memory device is not visible to the user of the electronic device or others. Attackers and other undesired persons can attempt to gain unauthorized access (e.g., tamper with) the memory device to obtain or learn the secure/private data. It is desirable to protect the memory device from attacks to the memory device itself as well as unauthorized attempts to access data stored therein and/or information associated therewith. It is also desirable to provide a user (e.g., owner) of the memory device with information regarding attempts by others to attack or access the memory device.

Systems and/or methods that can facilitate detecting attempts to tamper with a memory device and protecting a memory device from such tampering attempts are presented. The memory device (e.g., flash memory device) can include a counter tamper component that can facilitate detecting tamper events (e.g., tamper attacks), generating and/or providing evidence of tamper events, providing resistance to tamper events, and/or generating responses to attempts to tamper with the memory device and/or the data stored therein.

Turning to the figures, FIG. 1 illustrates a system 100 that can secure data from tampering in accordance with the disclosed subject matter. System 100 can include a memory module 102 that can be comprised of a memory 104 that can store data in individual memory locations within the memory 104.

In accordance with an aspect, the memory 104 can be a non-volatile memory, such as flash memory (e.g., single-bit flash memory, multi-bit flash memory), read only memory (ROM), programmable ROM (PROM), electrically programmable ROM (EPROM), electrically erasable programmable ROM (EEPROM), and/or nonvolatile random access memory (NVRAM) (e.g., Ferroelectric random access memory (FeRAM)), and the like. Further, the flash memory can be comprised of NOR flash memory and/or NAND flash memory.

Memory module 102 can further include a counter tamper component 106 that can be associated with the memory 104 and memory module 102, and can facilitate securing data stored in the memory component 104 from unauthorized access by undesired entities (e.g., attackers). The counter tamper component 106 can facilitate resisting and/or responding to attempts to tamper with the memory module 102 and/or memory component 104, and/or can provide evidence of attempts to tamper with the memory module 102 and/or memory component 104.

In accordance with one aspect, the counter tamper component 106 can be incorporated as part of the casing of the memory module 102 and can provide evidence of tampering, where, for example, the casing of the memory module 102 can fracture if opened such that re-closure of the casing of the memory module 102 can be prevented and/or the fracture can be perceived if the casing of the memory module 102 is re-closed. In another aspect, the counter tamper component 106 can be incorporated as part of the casing of the memory module 102 as the casing of the memory module 102 can be formed from a material that can change state (e.g., change color state), in reaction to a tamper event (e.g., tamper attack).

For example, if an entity attempts to authenticate in order to gain access to the data in the memory component 104, but provides improper authentication information and is denied such access, the casing of the memory module 102 can change its color state, for example from a first color(s) (e.g., black) to a different color(s) (e.g., orange), which can indicate to the user (e.g., owner) of the memory module 102 (and the electronic device (not shown) in which the memory module 102 resides) that an entity has tampered with the memory module 102 and/or memory 104. The casing of the electronic device can be designed so that the memory module 102 can be visible to the user, so that the user can perceive a change in the color state of the memory module, as more fully described herein, for example, with regard to FIGS. 4a and 4b, infra.

In accordance with still another aspect, the counter tamper component 106 can resist a tamper attack, such as a side-channel or other attack, where an attacker attempts to obtain information associated with power consumption, electromagnetic radiation, and/or radio frequency emissions associated with data manipulation (e.g., cryptographic protocol) in order to gain unauthorized access to the data stored in the memory and/or the cryptographic protocol (e.g., exponent). The counter tamper component 106 can include a material that can be employed in the memory module 102 and/or the non-volatile memory 104 and can resist such attacks, as the material can prevent, minimize, and/or reduce, and/or can render indistinguishable, the amount of power consumption, electromagnetic radiation, and/or radio frequency emissions emitted by the memory module 102 and/or memory component 104.

In yet another aspect, the counter tamper component 106 can employ various types of check circuits (e.g., mesh circuit, throw switch circuit) that can be used to detect whether an attempt is being made to remove the memory component 104 from the memory module 102. The counter tamper component 106 can provide a response to such an attack (e.g., tamper event) by, for example, erasing all or a portion of data stored within the memory component 104 and/or initiating a failure (e.g., fusing circuit components together) of one or more components (e.g., memory array (not shown)), such that the components can be rendered inoperable and/or inaccessible.

Figure 2A:
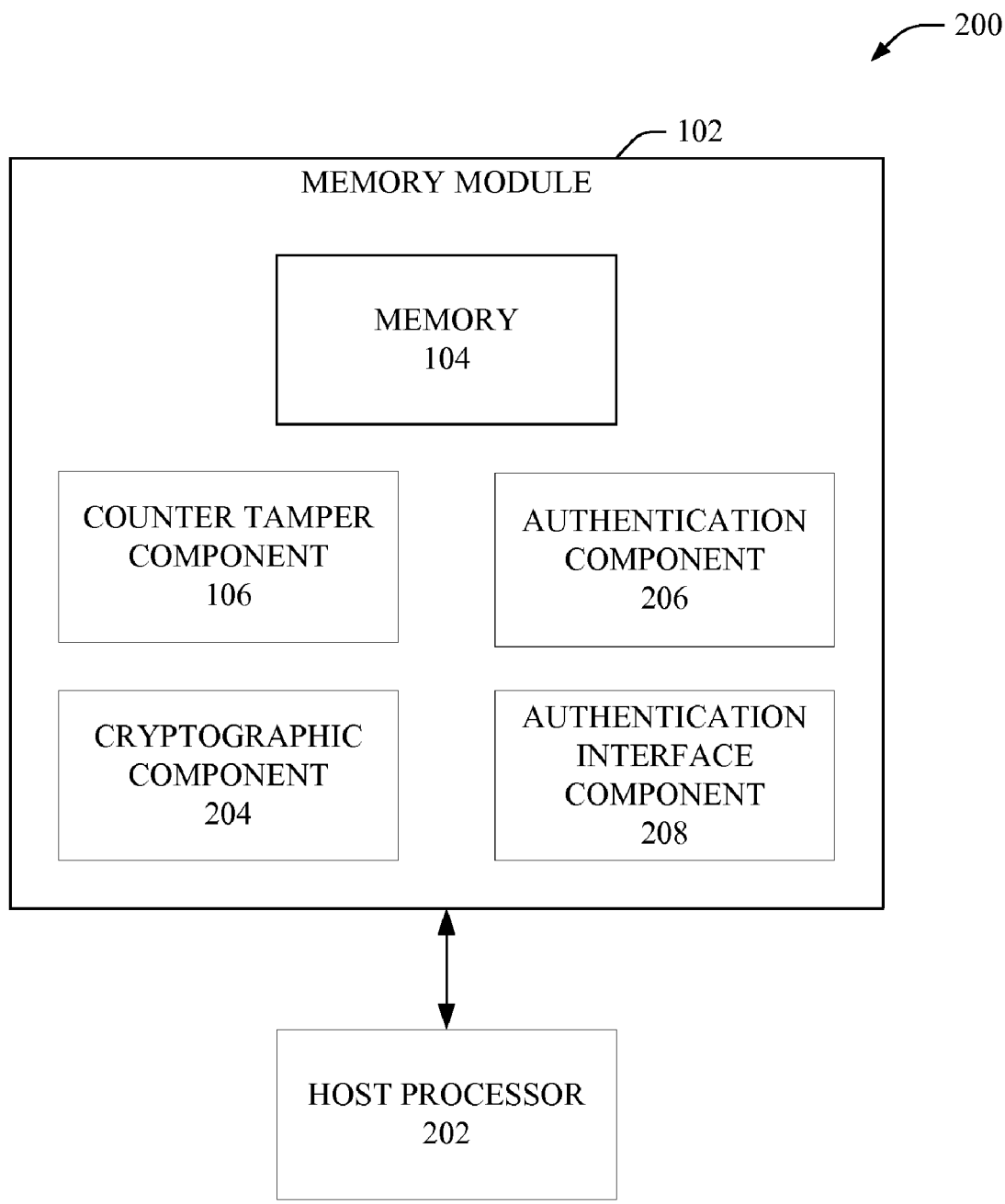
FIG. 2a illustrates a system that secures data in accordance with one embodiment of the disclosed subject matter.

Referring to FIG. 2a, depicted is a system 200 that can facilitate securing information stored in a memory in accordance with one embodiment of the disclosed subject matter. System 200 can include a memory module 102, which can include a memory 104 (e.g., a non-volatile memory) that can store data in respective memory locations within the memory 104. The memory module 102 can further include a counter tamper component 106 that can facilitate detecting tamper event(s) and providing a desired reaction to such tamper event(s) in order to facilitate securing the data stored in the memory 104. The memory module 102, memory 104, and counter tamper component 106 can each include their respective functionality as more fully described herein, for example, with regard to system 100 and/or system 300, as described infra.

The memory module 102, and components (e.g., memory 104) contained therein, can be associated with a host processor 202 that can be can be an applications processor that can manage communications and run applications. In one aspect, the host processor 202 can be a processor that can be utilized by a computer, a mobile handset, personal digital assistant (PDA), or virtually any other electronic device. The host processor 202 can generate commands, such as read commands, write commands, and/or erase commands that can be executed respectively to read data from, write data to, and/or erase data from the memory 104. Data being written to or read from memory 104 can be communicated or transmitted between the memory 104 and the host processor 202 and/or other components (not shown) via a bus (e.g., system bus), which can be a multi-bit bus.

The memory module 102 can further include a cryptographic component 204 that can facilitate encrypting and/or decrypting data to facilitate securing data being written to, stored in, and/or read from the memory 104. In accordance with an aspect of the disclosed subject matter, cryptographic component 204 can provide symmetric cryptographic tools and accelerators (e.g., Twofish, Blowfish, AES, TDES, IDEA, CAST5, RC4, etc.) to ensure that a specified partition (not shown) in the memory 104, or portions thereof, can only be accessed by those entities authorized and/or authenticated to do so. Cryptographic component 204 can also provide asymmetric cryptographic accelerators and tools (e.g., RSA, Digital Signature Standard (DSS), and the like) to ensure that a specified partition in the memory 104, or portions thereof, only can be accessed by those entities that are authorized and certified to do so. Additionally, cryptographic component 204 can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in the memory 104 is confined to those entities authorized to gain access.

The memory module 102 can also include an authentication component 206 that can solicit authentication data from an entity, and, upon the authentication data so solicited, can be employed, individually and/or in conjunction with information acquired and ascertained as a result of biometric modalities employed, to facilitate control access to the memory 104. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 206. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 206 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, finger print (or hand print) identification that scans the corrugated ridges of skin that are non-continuous and form a pattern that can provide distinguishing features to identify an entity, and/or voice recognition where the voice of the entity can be analyzed based in part on speech pattern, tone, etc. that can distinguish the entity from another entity.

The authentication component 206 can be associated with an authentication interface component 208 that can be incorporated in to the memory module 102 and can facilitate authenticating a user(s) or others. In one aspect, the authentication interface component 208 can be associated with a keypad (not shown) and can receive authentication information, such as password, PIN numbers, etc. that the authentication component can evaluate to determine whether to grant access to the memory 104. In another aspect, the authentication interface component 208 can be comprised of a scanner or other suitable component that can obtain and/or receive biometric information (e.g., information associated with fingerprints, eye features, facial features, voice recognition, etc.) that can be provided by or obtained from the user or other entities. The authentication component 206 can evaluate (e.g., compare) the biometric information with template information or other information that can be stored in the memory 104 to determine whether the biometric information can be associated with the user or other entity that is authorized and can be granted access to the memory 104, or a portion thereof. If such biometric information matches the template information or other information, the user or other entity associated with the biometric information can be granted access to the data, or a portion of the data, stored within the memory 104 based in part on the level of access rights that can be granted to the user or other entity. For example, an authentication interface component 208 can be comprised of a fingerprint sensor (not shown) that can be incorporated into the surface of the casing of the memory module 102 or the casing of the electronic device (not shown) in which the memory module 102 resides. The user can place one or more digits upon the fingerprint sensor, which can scan the one or more digits to obtain biometric information. The biometric information can be captured and compared with the template information that can be stored in memory 104. If the biometric information matches such that it meets a predetermined threshold level of accuracy, the user can be granted predetermined access rights associated with that user to access a subset of data in the memory 104.

In accordance with one embodiment of the disclosed subject matter, the memory module 102, including the memory 104, at least a portion of the counter tamper component 106, the cryptographic component 204, the authentication component 206, and/or at least a portion of the authentication interface component 208 can be situated or implemented on a single integrated-circuit chip (e.g., die), which can provide improved and/or increased data security of data programmed to, stored in, and/or read from the memory 104. In accordance with another embodiment, the memory module 102, including the memory 104, at least a portion of the counter tamper component 106, the cryptographic component 204, the authentication component 206, and/or at least a portion of the authentication interface component 208 can be implemented on an application-specific integrated-circuit (ASIC) chip.

Figure 2B:
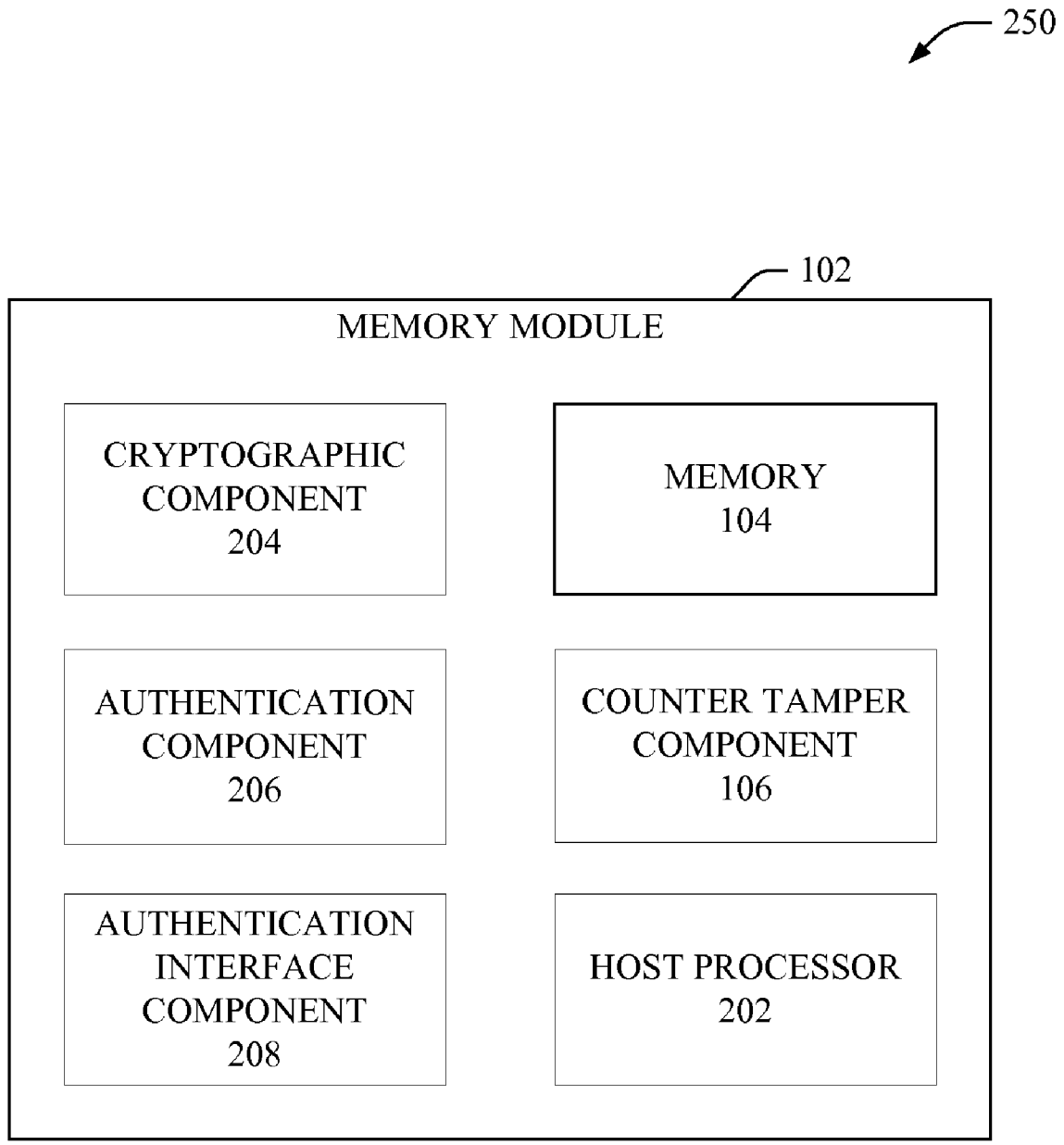
FIG. 2b depicts a system that secures data in accordance with an embodiment of the claimed subject matter.

Referring to FIG. 2*b*, depicted is a system 250 that can facilitate securing data in accordance with another embodiment of the disclosed subject matter. System 250 can include the components (e.g., memory 104, counter tamper component 106, etc.) described with regard to system 200, where each component can include their respective functionality as more fully described herein, for example, with regard to system 200. System 250 can include the host processor 202, where the host processor 202 can be contained within the memory module 102. By incorporating the host processor 202 within the memory module 102, security of the data being communicated between the host processor 202 and the memory 104 and/or other components within the memory module 102 can be improved and/or facilitated.

Figure 3:
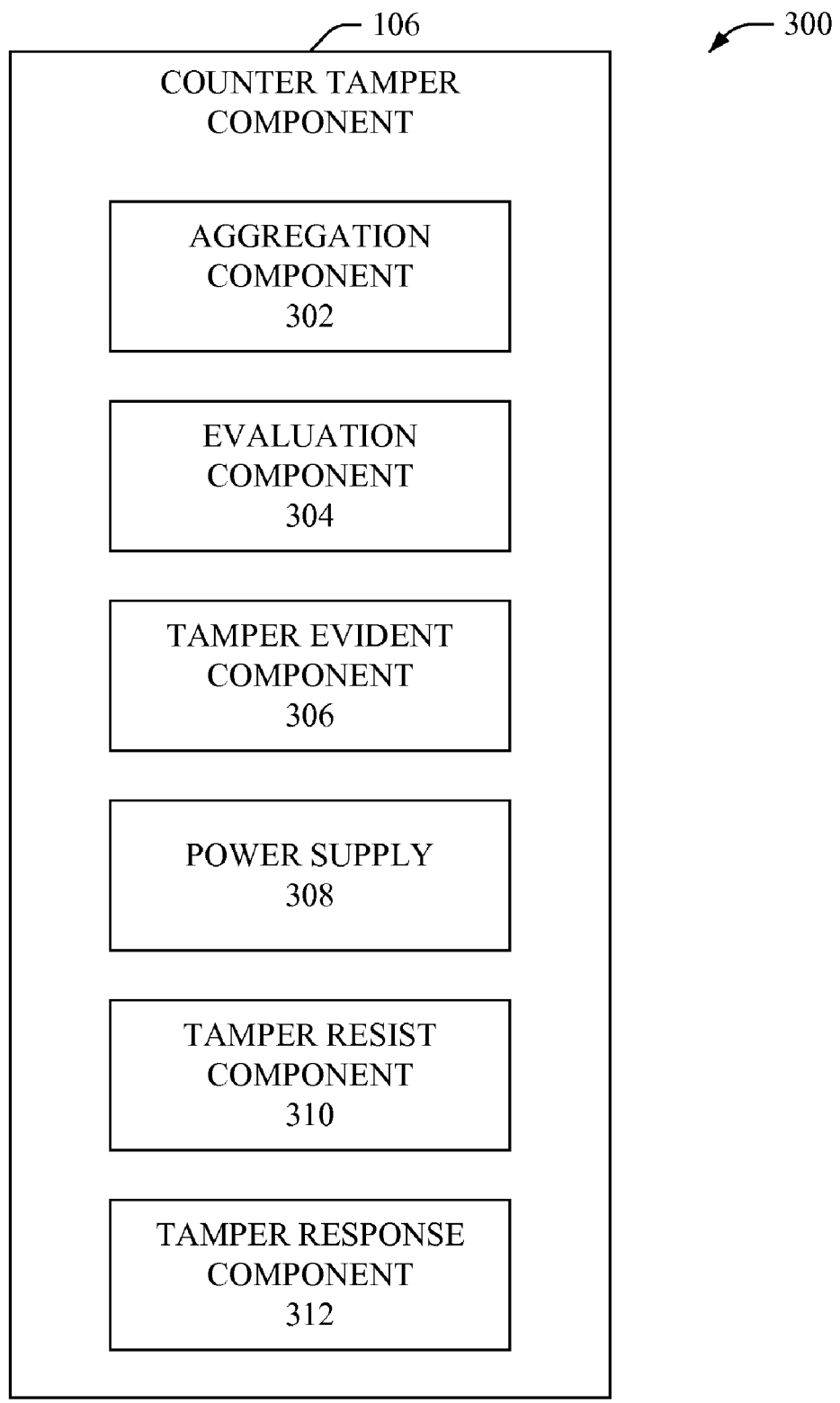
FIG. 3 illustrates a system that secures data in accordance with an aspect of the disclosed subject matter.

FIG. 3 illustrates a system 300 that can employ counter tamper techniques to facilitate securing data in a memory device in accordance with the disclosed subject matter. System 300 can include a counter tamper component 106 that can be used to monitor and evaluate events associated with authorized or unauthorized attempts to access a memory 104 (not shown) in a memory module 102 (not shown) and can employ counter tampering techniques to secure the data written to, stored in, and/or read from the memory 104 from tamper attacks. The counter tamper component 106 can detect tamper attacks, or attempts to temper, associated with the memory module 102 and/or memory 104 and can react (e.g., provide evidence of the attack/attempt, resist the attack/attempt, provide response to the attack/attempt) to the tamper attack based in part on the type of tamper attack or tamper attempt. For example, if an attempt is made by an unauthorized entity to access the memory module 102 and/or memory 104, the counter tamper component 106 can provide evidence that the attack occurred, provide resistance to the attack, and/or provide a response to the attack. The counter tamper component 106 can include the same or similar functionality as more fully described herein, for example, with regard to system 100 and/or system 200.

In accordance with an aspect, the counter tamper component 106 can include an aggregation component 302 that can aggregate and/or organize data, including data associated with accessing the memory 104 and/or memory module 102, which can be received or obtained by the counter tamper component 106 in order to facilitate determining whether a tamper attack is or has occurred, determining a reaction that can be generated regarding a tamper attack, generating and/or providing evidence of a tamper attack, generating and/or providing a response to a tamper attack, resisting a tamper attack, etc. The aggregation component 302 can filter, select, and/or organize the data received by the counter tamper component 106. For instance, the aggregation component 302 can identify portions of data that can be associated with a tamper attack and/or an attempt to access the memory 104 and/or memory module 102. It is to be appreciated that the aggregation component 302 can be incorporated into the counter tamper component (as depicted), a stand-alone component, and/or most any suitable combination thereof.

In accordance with another aspect, the counter tamper component 106 can include an evaluation component 304 that can monitor, collect, and/or analyze received data and can facilitate determining, for example, whether an attempt is being made to access the memory 104 and/or the memory module 102, whether a tamper attack is or has occurred, a type of tamper attack that is or has occurred, a reaction that can be generated regarding a tamper attack, etc.

For example, the aggregation component 302 can receive information regarding attempts to enter authentication credentials to access the memory 104. The aggregation component 302 can count the number of attempts to enter such credentials. Each attempt to enter the authentication credentials can be logged by the aggregation component 302 and evaluated by the evaluation component 304. The aggregation component 302 can communicate the count information to the evaluation component 304. The evaluation component 304 can evaluate information associated with the authentication attempts, and, after a predetermined number of unsuccessful attempts have been made (e.g. three consecutive unsuccessful attempts), the evaluation component 304 can determine that the such invalid attempts constitute a tamper attack in relation to the memory 104, and the counter tamper component 106 can react to the tamper attack in a desired manner (e.g., casing of module 102 can change color state), for example, as more fully described herein.

In yet another aspect, the counter tamper component 106 can employ a tamper evident component 306 that can facilitate providing evidence of a tamper attack(s) (e.g., tamper event) or an attempt to tamper with the memory 104 and/or the memory module 102. In an aspect, the counter tamper component 106, in part, can be incorporated as part of the casing of the memory module 102. The casing of the memory module 102 can be constructed of material(s), such as a brittle material (e.g., brittle plastic material), that can result in the casing being disrupted if opened such that it can be virtually impossible to re-close without a perceivable indication (e.g., evidence) of tampering in the form of physical disruption of the enclosure (e.g., casing). For example, the casing of the memory module 102 and/or the casing of the memory 104 can fracture and/or break into multiple pieces that can prevent the casing of the memory module 102 and/or the casing of the memory 104 from being returned to their original, untampered state. While the memory 104 can thereafter be inaccessible and the data stored therein can be destroyed, the data can still be secured from unauthorized access by the attacker. In another aspect, the casing of the memory module 102 can be manufactured from a material that can have ductile material characteristics. If an attempt is made to open or access the casing of the memory module 102, e.g., in an attempt to open the casing of the memory module 102 to access the memory 104 contained within, such casing can be deformed as a result of the stresses and/or strains applied during the opening of, or attempt to open, the casing of the memory module 102, and such casing can retain the deformation. The deformation can be sufficient to prevent the casing from being returned to its original, untampered state, and the deformation can be evidence of the tamper attack that can be observable by the user.

In another aspect, the tamper evident component 306 can include a cover that can be employed, which can be a seal or sticker, for example, and the cover can be attached to the memory module 102. During an attempt to peel back and/or remove the seal/sticker from the memory module 102, the seal or sticker can wrinkle or tear, for example, which can be evidence of disturbance of the seal/sticker that can be discernible by the user.

In still another aspect, the casing of memory module 102 can be composed of a material that can alter state, e.g., color(s), based in part on physical, thermal, and/or electronic changes and events placed upon such casing during and resulting from an attempt(s) to tamper with the casing of the memory module 102, the memory 104, and/or other components which comprise the memory module 102.

For example, the counter tamper component 106 can receive information that an entity has attempted to authenticate a predetermined number of times (e.g., three times) in order to access the memory 104, and all attempts were unsuccessful due to improper authentication information being provided by the entity. The tamper evident component 306 can provide evidence that such tamper event has occurred, for example, by changing the color state of the casing of the memory module 102 that can contain the memory 104 and/or illuminating a light emitting diode(s) (LED(s)) (e.g., LED display, multi-color LED display) (not shown) that can be on or associated with the memory module 102 and displaying such change of color state so that it can be observed by a user. The tamper evident component 306 can facilitate displaying on the casing of the module 102 (e.g., the casing itself, a display integrated with the casing) a first subset of colors (one or more colors) when the memory module 102 is in an untampered state, and can facilitate displaying on the casing of the module 102 a disparate subset of colors (one or more colors) when the memory module 102 is in a tampered state.

The counter tamper component 106 can facilitate enabling an authorized user (e.g., owner) of the electronic device can re-set the color state associated with the casing of the memory module 102 to a color that can correspond to an untampered state upon presentation of proper authentication credentials that can identify the user as one authorized to re-set the color state of the memory module 102 and/or access the memory 104. Having the casing of the module 102 display the evidence of tampering, via the tamper evident component 306, for example, by having the casing of the module 102 change color(s), and/or a display (e.g., LED display) contained on or integrated with the casing of the module 102 that can change color(s), can facilitate improving the security of the module 102, the memory 104 therein, and/or the data stored in the memory 104, as compared to simply providing evidence of tampering to a display (e.g., graphical user interface (GUI)) of the electronic device in which the memory module 102 resides, where an attacker can attempt to bypass such security measure by disrupting the communication of the tamper evidence to the electronic device display. Such module casing and/or display of the tamper evident component 306 can reduce the risk of an attacker disconnecting or bypassing the tamper evident component 306, as the casing of the module 102 itself is providing the evidence of tampering and/or the display that can provide evidence of tampering can be integrated in the casing of the module 102. Further, other counter tamper techniques (e.g., mesh circuit, switch circuit, etc.) can be employed along with the change of color state of the module 102 to reduce the risk of tampering by an attacker to further secure the module 102, memory 104, and data stored therein.

As another example, during a de-soldering attempt to remove the memory module 102 from the electronic device within which it can be contained, the counter tamper component 106 can detect the tamper event, and the tamper evident component 306 can provide evidence of the tamper attack, as the casing of the memory module 102 can react to the thermal disturbance of the desoldering process by a change in color state, e.g., the casing of the memory module 102 can change from black to red, for example. The change in color state of the casing of the memory module 102 can be visible to the user of the electronic device and can inform the user visually that an attempt to tamper with the memory module 102 has occurred.

Figure 4A:
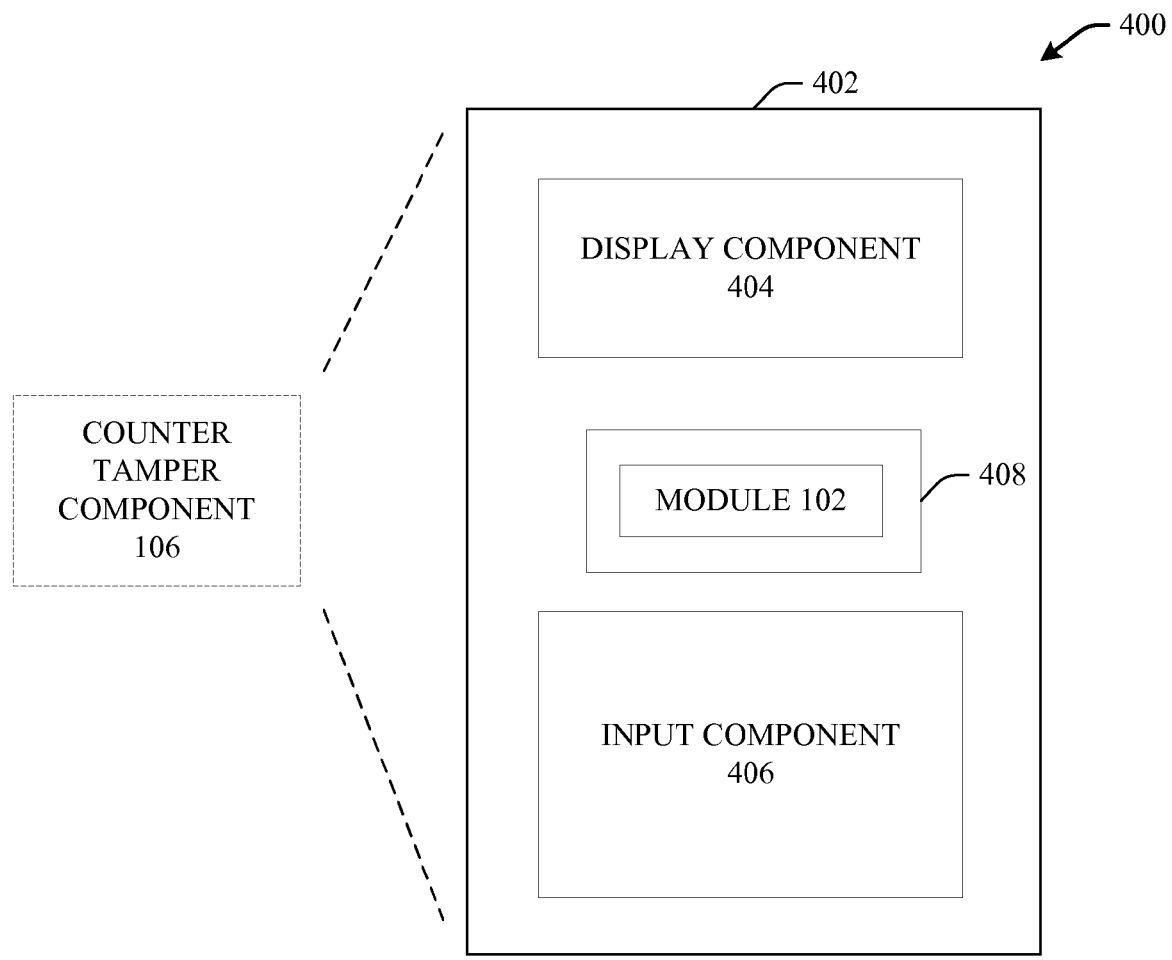
FIG. 4a illustrates a top view diagram of an example of an electronic device that includes a memory device in accordance with an aspect of the disclosed subject matter
Figure 4B:
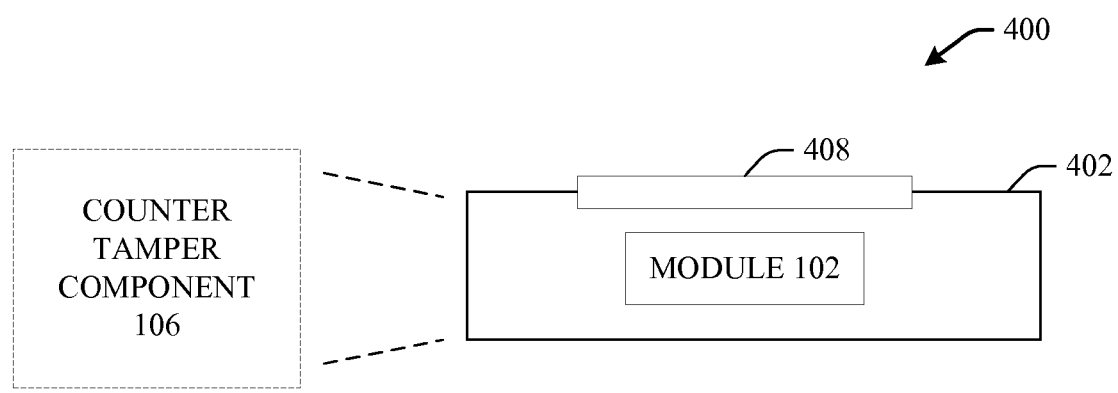
FIG. 4b depicts a cross section view of an example of an electronic device that includes a memory device in accordance with an aspect of the disclosed subject matter.

As the memory module 102 can be contained within the electronic device (not shown), to enable the evidence of tampering to be perceived by the user, the electronic device can be constructed so that there can be a window or other transparent component that can be positioned on the casing of the electronic device so that the user can see the memory module casing within the electronic device in order to observe the evidence of tampering (e.g., change of color state of the memory module), as more fully described herein, for example, with regard to FIG. 4a and FIG. 4b. In one aspect, the casing of the memory module 102 can be designed to be aesthetically desirable to users, such as by having a desirable shape, a desirable logo thereon, a desirable color(s), and/or a surface that can be customizable, where, for example, a user can input his/her name or a word or phrase that can be displayed on the surface of the casing of the memory module 102 to personalize the memory module 102 and the electronic device in which the module 102 resides.

In yet another aspect, the tamper evident component 306 can employ a speaker (not shown) and an amplifier (not shown) and, when a tamper attack (e.g., entity denied access after authentication has failed a predetermined number of times) occurs, the tamper evident component 306 can facilitate generating an audio signal that can be amplified by the amplifier and presented as an audio output via the speaker that can be evidence that a tamper attack has or is occurring. In accordance with an aspect, to conserve power consumption, the audio signal can be provided for a predetermined period of time (e.g., one minute) and can terminate after such time. For example, if a tamper attack occurs, the tamper evident component 306 can facilitate changing the color of the casing of the memory module 102 and outputting an audio signal as evidence of the tamper attack. After a predetermined period of time, the tamper evident component 306 can cause the audio signal to cease in order to facilitate conserving power, but the change in color state can remain so that if the user did not have the opportunity to hear the audio signal, the user can still observe the evidence of tampering.

In accordance with another aspect, the tamper evident component 306 can employ a sensory component (not shown) that can vibrate and thereby cause the casing of the memory module 102 and/or the casing of the electronic device in which the memory module 102 resides to vibrate when a tamper attack occurs, which can be evidence that a tamper attack has or is occurring. In accordance with an aspect, to conserve power consumption, the vibration can be provided for a predetermined period of time (e.g., one minute) and can terminate after such time. For example, if a tamper attack occurs, the tamper evident component 306 can facilitate changing the color of the casing of the memory module 102 and generating vibrations as evidence of the tamper attack. After a predetermined period of time, the tamper evident component 306 can cause the vibrations to cease in order to facilitate conserving power, but the change in color state can remain so that if the user did not have the opportunity to perceive the vibrations, the user can still observe the evidence of tampering.

The counter tamper component 106 can include a power supply 308 (e.g., lithium battery) that can provide suitable power to facilitate a change(s) in color state of the casing of the memory module 102, generation and amplification of audio signals, and/or generation of vibrations associated with the sensory component. The power supply 308 can be rechargeable and can be charged via a charge supplied to the electronic device in which the memory module 102 can reside.

In accordance with another aspect of the disclosed subject matter, the counter tamper component 106 can include a tamper resist component 310 that can facilitate resisting attempts by entities to tamper with (e.g., gain unauthorized access to data) the memory 104. Attackers can attempt to obtain side-channel information, such as information associated with power consumption, electromagnetic radiation, and/or radio frequency characteristics related to the electronic device, for example, with regard to the cryptographic component 204 that can be included in the memory module 102.

The cryptographic component 204 can employ a cryptographic protocol(s) to facilitate encrypting and/or decrypting data being written to or read from the memory 104. The cryptographic component 204 can perform calculations in accordance with a cryptographic protocol(s) to facilitate data encryption/decryption. Different types of calculations (e.g., multiplication, squaring, etc.) can have distinct and respective power consumption levels, electromagnetic radiation levels, and/or radio frequency characteristics that an attacker can obtain and analyze in order to learn information (e.g., cryptographic algorithm, exponent) that the attacker can utilize to gain access to and/or decrypt data stored in the memory 104.

To further illustrate, operation of the memory module 102 can include processing and storing of information within the memory 104 itself and associated components, as well as interactions with processors (e.g., host processor 202) that can be external to the memory module 102. For example, during operation radio waves can be generated as an electrical current fluctuates within the memory module 102 and/or the electronic device in which the memory module 102 is contained. The radio waves, and/or other emanations, can be intercepted and analyzed by an attacker to determine intelligence-bearing information that may be contained and disclosed relating to the operation of the memory module 102 and/or the electronic device.

In accordance with an aspect, the tamper resist component 310 can be comprised of a shielding material(s) that can eliminate, minimize, and/or reduce the level of power consumption, the level of electromagnetic radiation, and/or the level of output radio frequency information, and/or can alter information associated with the power consumption, electromagnetic radiation, and/or radio frequency to facilitate resisting tamper attacks by attackers. In one aspect, the tamper resistant shielding(s) can be employed within the memory module 102 and/or the electronic device in which the module 102 resides. In another aspect, the tamper-resistant shielding (s) can be comprised of a metal or other suitable material that can facilitate reducing output and/or altering information associated with power consumption, electromagnetic radiation, and/or radio frequency.

In another aspect, the tamper resist component 310 can also work in conjunction with the authentication component 206 to facilitate resisting tamper attacks, as authentication protocols can be employed to resist or inhibit unauthorized attempts to access the memory 104 and/or data stored therein. For example, the tamper resist component 310 can facilitate resisting a tamper attack where an entity attempts to provide authentication credentials to the memory module 102 in order to access the memory 104. The tamper resist component 310 in conjunction with the evaluation component 304 can analyze the authentication credentials presented and can determine whether the credentials are proper. If the credentials are not proper, the tamper resist component 310 can facilitate denying the entity access to the memory 104 and the data stored therein.

In accordance with yet another aspect of the disclosed subject matter, the counter tamper component 106 can include a tamper response component 312 that can facilitate determining whether a tamper attack has occurred in relation to the memory module 102, memory 104, electronic device, etc., and can provide a desired response to a tamper attack(s). In one aspect, if the tamper response component 312 determines that a tamper attack has occurred for which a tamper response is desired, the tamper response component 312 can initiate a desired tamper response.

In one aspect, the tamper response component 312 can employ a "mesh" circuit that can facilitate detection of a tamper attack in relation to the memory module 102 and/or memory 104. The memory module 102 can include a plurality of pins (not shown) that can be utilized to electrically connect the memory module 102 to a PCB (not shown), as the pins can be soldered to the PCB or can be inserted into a socket (not shown) that can be soldered to the PCB. The mesh circuit can be constructed between one or more pins of the memory module 102 and the conductive pathways incorporated in to the PCB on which the memory module 102 can reside. For example, the mesh circuit can run from a pin of the memory module 102 to a corresponding conductive path of the PCB to another conductive path of the PCB and into another pin corresponding to the other conductive path, as desired, to form the mesh. In one aspect, the "mesh" can be a wire mesh, located/sandwiched between the memory module and the PCB, connecting one or more pins on the memory module 102.

Once the mesh circuit is constructed, an electronic check signal (e.g. voltage) of predetermined voltage level and/or strength can be applied across the mesh circuit. The power to generate the electronic check signal can be provided by the power supply 308, for example. The electronic check signal can be monitored and analyzed by the evaluation component 304 and/or the tamper response component 312, for example, to evaluate signal continuity and/or signal strength. If the signal is broken and/or a change (e.g., variance) in signal strength is detected (e.g. a voltage drop), the tamper response component 312 can initiate a tamper response. In one aspect, the tamper response component 312 can initiate an erasure (e.g., zeroization) of all or a subset of the data stored in the memory 104. For example, if the check signal associated with the mesh circuit changes such that it is determined that a tamper attack occurred, the tamper response component 312 can erase data in secure partitions of the memory 104, so that such data (e.g., sensitive data, personal data) cannot be accessed by the unauthorized entity (e.g., attacker).

In accordance with another aspect, in response to such tamper attack, the tamper response component 312 can initiate catastrophic failure and/or graceful failure of one or more components (e.g., memory 104) in or associated with the memory module 102. Catastrophic failure of a component can be destruction (e.g., short circuiting, melding of circuitry) such that the component cannot be replaced or made operable. Graceful failure of a component (e.g., memory 104) can be such that the component and/or memory module 102 can be rendered inoperable, but the failed component(s) can be made operable and/or replaced allowing the memory module 102 to again become fully functional.

In still another aspect of the disclosed subject matter, the tamper response component 312 can employ a throw switch that can be placed in the depressed position between portions of the casing of the memory module 102. During an attempt to open or remove the casing of memory module 102, or a portion thereof, the throw switch can be activated to change its state by the removal of pressure on the switch actuator as the case is opened or removed. The tamper response component 312, and/or evaluation component 304 that can be associated therewith, can determine that a tamper attack has occurred and can provide a response to the tamper event. In one aspect, the response to such tamper attack can be an erasure (e.g., zeroization) of all or a portion of the data stored in the memory 104. In another aspect, the response to the tamper attack can be a catastrophic failure and/or graceful failure of one or more components (e.g., memory 104) associated with the memory module 102.

In accordance with various other aspects of the disclosed subject matter, the counter tamper component 106 can detect and react to other forms of tampering, such as, for example, freezing of the memory module 102, application of out-of-specification voltages to the memory module 102, power surges supplied to the memory module 102, fault attacks associated with the data, and/or variance of clock signals associated with the memory 104, and the like. Upon detecting such attacks, the counter tamper component 106 can initiate a desired reaction (e.g., change of color state of the memory module 102) to the tamper attack based in part on the type of tamper attack.

Referring to FIG. 4a, depicted is a system 400 that can facilitate securing data from tampering can in accordance with an embodiment of the disclosed subject matter. System 400 can be or can include an electronic device (e.g. cellular phone, PDA, etc.) that can be comprised of various components, including, for example, a memory module 102, memory 104 (not shown), counter tamper component 106, host processor 202 (not shown), cryptographic component 204 (not shown), and/or authentication component 206 (not shown). It is to be appreciated that the memory module 102, memory 104, counter tamper component 106, host processor 202, cryptographic component 204, and/or authentication component 206 each can include the same or similar respective functionality as more fully described herein, for example, with regard to system 100, system 200, and/or system 300. The electronic device of system 400 can be comprised of an electronic device casing 402 that can contain components and circuitry associated with electronic device. Located on the face of the electronic device casing 402 can be a display component 404 (e.g., (GUI) that can be used to display information to the user and/or others. In one aspect, the display component 404 can be a color GUI of a desired size and shape that can display text and/or images (e.g., photographs, video, icons, etc.) to a user. In another aspect, the display component 404 can also be an interface that can receive information (e.g., touch screen) entered by a user that can be input to the electronic device and processed (e.g., to read data from memory 104, write data to memory 104, engage a function associated with the electronic device, etc.) based in part of the information provided to facilitate navigating information stored in the memory 104 and/or functions associated with the electronic device.

System 400 can also include an input component 406 (e.g., keypad) that can be utilized to facilitate navigating information stored in the memory 104 and/or functions of the electronic device and entering information, such as names, telephone numbers, and/or text messages, for example. A user can enter information via the input component 406 to provide data that can be stored in the memory 104 and/or retrieve data from the memory 104, and/or to engage a function associated with the electronic device.

The electronic device can further include a window component 408 that can be transparent, or substantially transparent, so that it can enable internal components (e.g., the memory module 102) of the electronic device to be perceived by the user and/or others. In one aspect, the window component 408 can facilitate detection of tamper attacks and/or providing evidence of tamper attacks to the memory module 102 and/or the memory 104 that can be contained therein. In accordance with an aspect, the window component 408 can be positioned on the same side of the casing of the electronic device as the display component 404 between the display component 404 and the input component 406. In another aspect, the respective positions of the window component 408 and the memory module 102 can be such that the memory module 102, which can be contained within the electronic device, can be perceived by the user and/or others through the window component 408, so that the user and/or others can observe a state (e.g., color state) and/or condition (e.g., module 102 is deformed or not) of the memory module 102. In still another aspect, the window component 408 can be a piece of clear plastic or other transparent material through which the memory module 102 can be perceived by the user and/or others viewing the side of the electronic device that contains the display component 404.

For example, if an entity attempts to access data (e.g., secure data) from the memory 104 by making attempts to enter authentication credential information in order to be granted access to such data, but provides incorrect authentication credential information, the counter tamper component 106 can determine that a tamper attack has occurred. In one aspect, the counter tamper component 106 can indicate that the tamper attack occurred by changing the color state of the memory module 102, for example, by changing the color of the casing of the memory module 102 from a first color(s) (e.g., black) to a disparate color(s) (e.g., red), and/or by changing the color(s) of a display (e.g., LED display), which can be integrated with the casing of module 102, from a first color(s) to a disparate color(s). The user (e.g., owner) of the electronic device can view the memory module 102 through the window component 408 and can perceive the color state change of the memory module 102, which can indicate to the user that a tamper attack occurred in relation to the memory module 102 and/or memory 104.

With regard to FIG. 4b, illustrated is a cross-section view of a system 400 that can facilitate securing data from tampering in accordance with an embodiment of the disclosed subject matter. The cross-section view of system 400 can be or can include the electronic device that can be comprised of the various components (e.g., memory 104 (not shown), counter tamper component 106, etc.) as described with regard to FIG. 4a. The electronic device can be comprised of an electronic device casing 402 that can contain the various components associated with the electronic device. In one aspect, the electronic device can include the memory module 102 that can include the memory device(s) 104 (not shown) that can store data in memory locations therein. The memory module 102 can be positioned within the electronic device and can be associated with other components (e.g., host processor 202 (not shown)) to facilitate storing data in and retrieving data from the memory 104. The window component 408 can be positioned on a surface of the electronic device such that the memory module 102 located inside the electronic device can be perceived by the user and others who can look through the window component 408 to observe the state (e.g., color state) and/or condition (e.g., formation, such as deformed or not) of the memory module 102. While not shown, the electronic device casing 402 also can include the display component 404 and/or input component 406.

In accordance with one aspect of the disclosed subject matter, the casing (e.g., shroud) of the memory module 102 can be designed to be aesthetically pleasing and can add decorative quality to the electronic device in which the memory module 102 is encased. If the memory module has been tampered with a tamper evident response is initiated and visible through the window component 930, for example a change in color state of the shroud.

Figure 5:
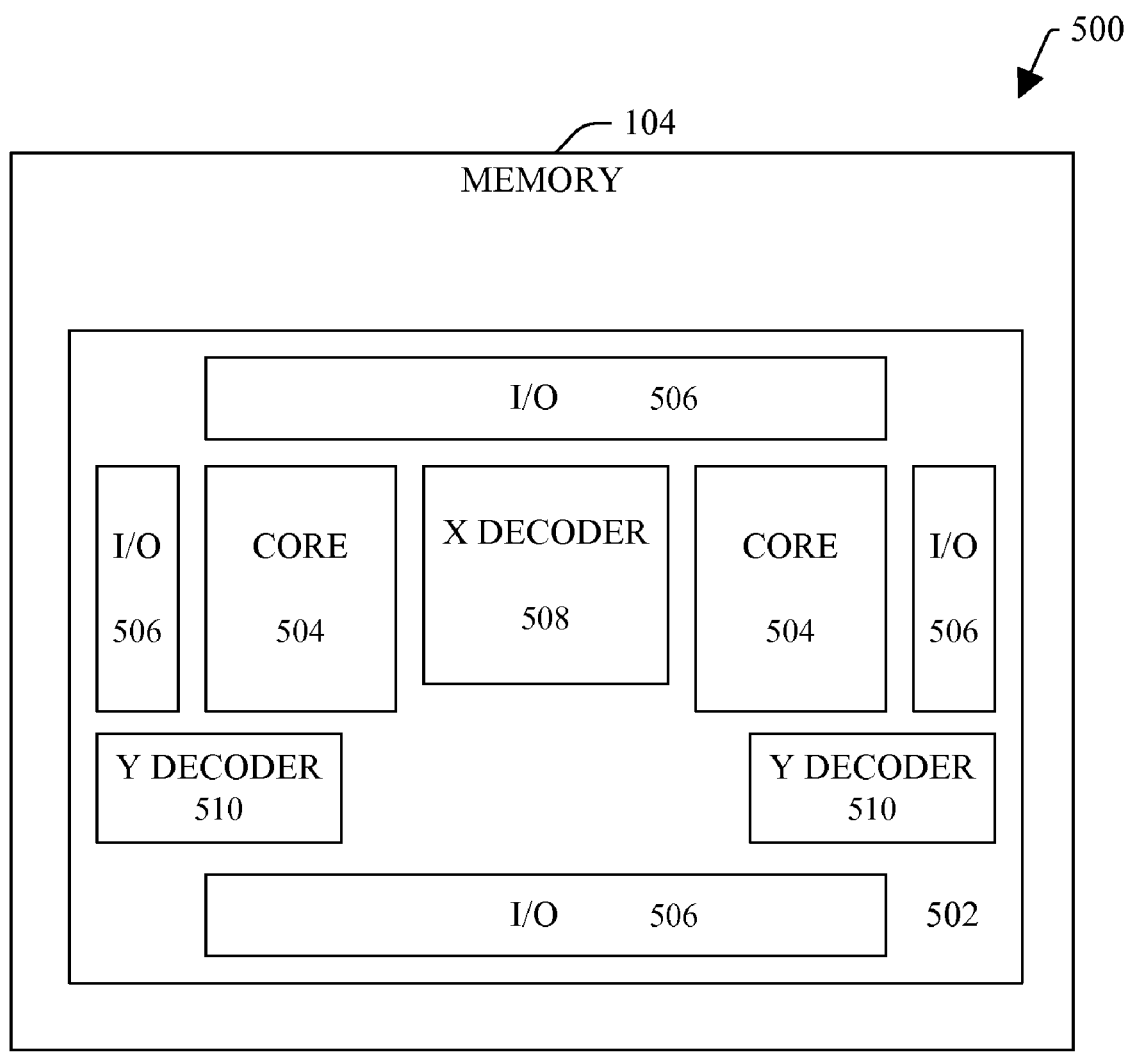
FIG. 5 illustrates a block diagram of a system that facilitates data storage in accordance with an aspect of the disclosed subject matter.

Referring to FIG. 5, a system 500 that can facilitate storing data in accordance with an embodiment of the disclosed subject matter is illustrated. System 500 can include a memory 104 that can store data, including sensitive and/or personal information for which data security is desired. In accordance with one aspect, the memory 104 can be a flash memory device (e.g., single-bit flash memory, multi-bit flash memory). The memory 104 can generally include a semiconductor substrate 502 in which one or more high-density core regions 504 and one or more lower-density peripheral regions can be formed. The high-density core regions 504 can typically include one or more M by N arrays (not shown) of individually addressable, substantially identical multi-bit memory cells (not shown). The lower-density peripheral regions on the other hand can typically include input/output (I/O) circuitry 506 and programming circuitry for selectively addressing the individual memory cells. The programming circuitry can be represented in part by and can include an x-decoder(s) 508 and y-decoder(s) 510 that cooperate with the I/O circuitry 506 for selectively connecting a source, gate, and/or drain of selected addressed memory cells to predetermined voltages or impedances to effect designated operations (e.g., programming, reading, and erasing, and deriving necessary voltages to effect such operations) on the respective memory cells. The counter tamper component 106 can be employed to facilitate protecting data written to, stored in, and/or read from the higher density core regions 504.

Figure 6:
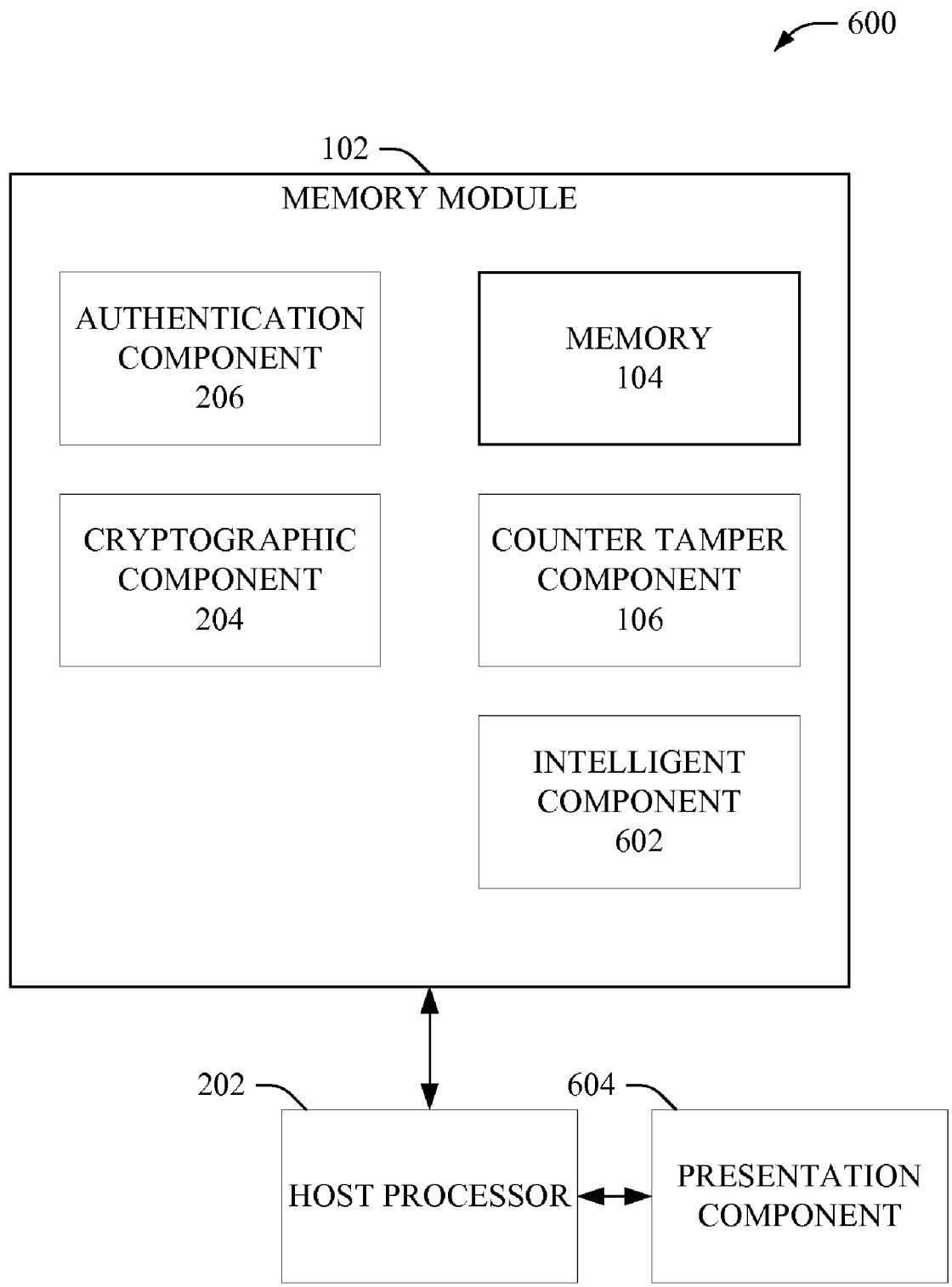
FIG. 6 illustrates a block diagram of a system that employs intelligence to facilitate securing data in accordance with an aspect of the disclosed subject matter.

Turning to FIG. 6 illustrated is a system 600 that can employ intelligence to facilitate securing data from tampering in accordance with an embodiment of the disclosed subject matter. System 600 can include a memory module 102, memory 104, counter tamper component 106, cryptographic component 204, and/or authentication component 206. The memory module 102, memory 104, counter tamper component 106 cryptographic component 204, and authentication component 206 each can be substantially similar to respective components and can include such respective functionality as described herein, for example, with regard to system 100, system 200, system 300, system 400, and/or system 500.

The system 600 can further include an intelligent component 602 that can be associated with the counter tamper component 106 to facilitate analyzing data and can render an inference(s) and/or a determination(s) regarding, for example, whether a tamper event (e.g., attack) has occurred, a type of tamper event, a type of reaction (e.g., provide evidence of tampering, provide response to tampering, resist tampering) that can be employed or initiated with regard to a tamper event, whether authentication credentials are valid, etc.

For example, the counter tamper component 106 can detect a variance in the strength of a signal associated with a mesh circuit connected with the memory module 102 and the PCB on which the memory module 102 is electrically connected. Information regarding the detected variance can be provided to the intelligent component 602, and, based in part on current and/or historical evidence, the intelligent component 602 can infer whether the detected variance of the signal is associated with a tamper attack.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 600 also can include a presentation component 604 that can present data associated with the host processor 202. It is to be appreciated that the presentation component 604 can be incorporated into the host processor 202 and/or a stand-alone unit. The presentation component 604 can provide various types of user interfaces to facilitate interaction between a user and any component coupled to the host processor 202.

The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor 706.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or an application programming interface (API). In addition, the command line interface can be employed in connection with hardware (e.g., video cards) and/or displays (e.g., black and white, and enhanced graphics adaptor (EGA)) with limited graphic support, and/or low bandwidth communication channels.

Figure 7:
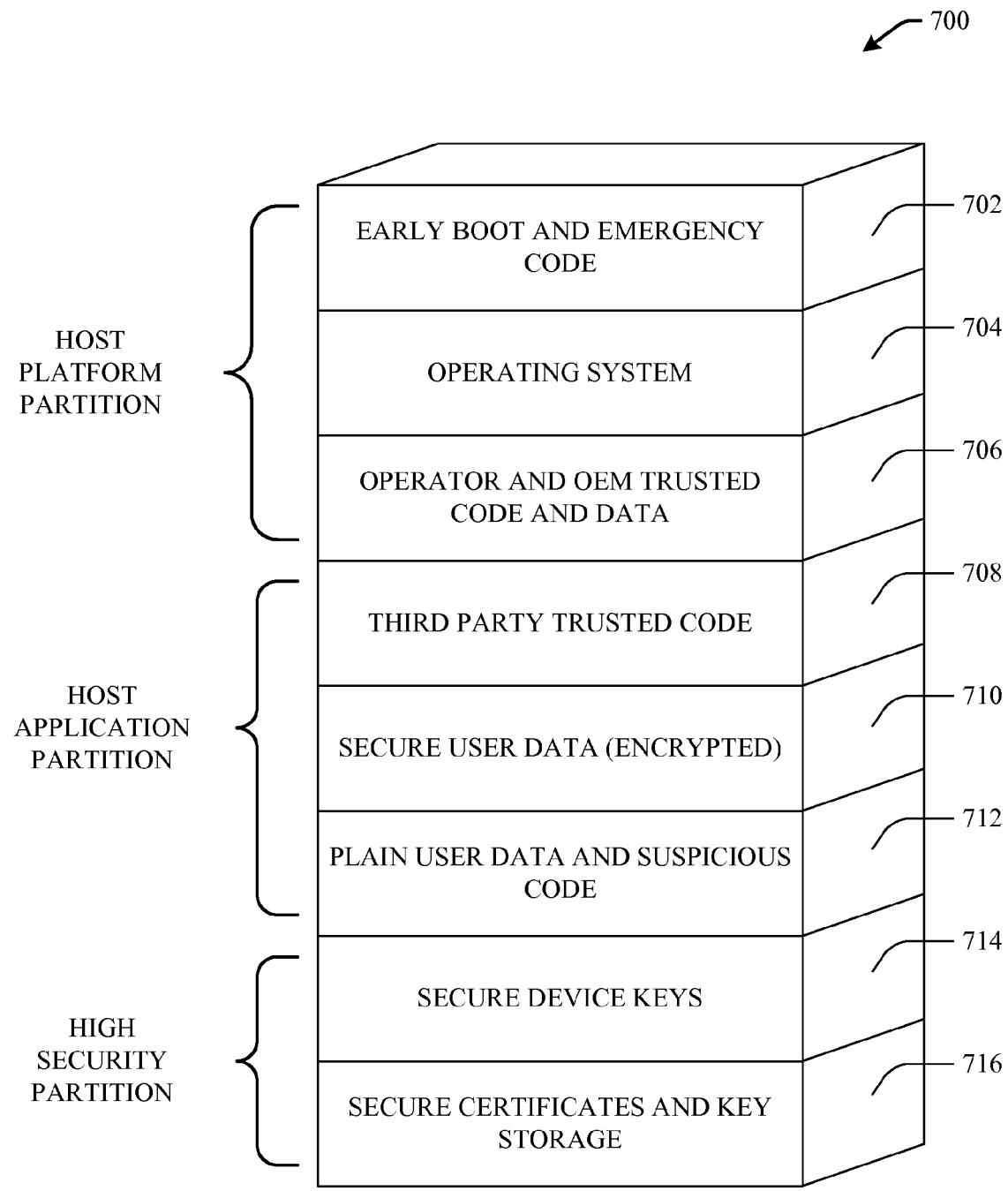
FIG. 7 depicts a block diagram of partitioning of a memory to facilitate data security in accordance with an aspect of the disclosed subject matter.

Referring to FIG. 7, illustrated is a system 700 that can employ memory partitioning to facilitate securing data in a memory in accordance with an aspect of the disclosed subject matter. System 700 can be utilized to facilitate securing data stored in a memory, such as memory 104, which can be a non-volatile memory.

For purposes of illustration the memory 104 can be divided into three sets of partitions (e.g., Host Platform Partition, Host Application Partition, and a High Security Partition, as depicted. The Host Platform Partition can comprise an early boot and emergency code partition 702, an operating system partition 704, and/or an operator and OEM trusted code and data partition 706. Further, Host Application Partition can include a third party trusted code partition 708, secure user data (encrypted) partition 710, and plain user data and suspicious code partition 712. Additionally, the High Security Partition can include a secure device keys partition 714 and a secure certificates and key storage partition 716.

As depicted, the partitioning system 700 can provide a multi-layered approach to ensure memory tamper protection and effective virus recovery. For example, Host Platform Partition, and partitions (e.g., partitions 702, 704, 706) contained therein, can be viewable and accessible by all entities, but only be modifiable by certain entities, such as, for example, an entity(ies) related to the manufacturer of the electronic device in which the memory 104 and/or memory module reside. Thus, partition 702, for instance can allow all entities to read and view the contents contained in partition 702, but can only allow entities that supply appropriate credentials (e.g., PKI authentication information) to write or modify the contents of partition 702. Partitions 704 and 706 on the other hand can allow select entities to read and write content of these partitions 704, 706, and more particularly, can only permit entities to read the contents of partitions 704 and/or 706 once, for example, an afterboot state has been established, and additionally can only allow entities that further supply appropriate credentials (e.g., PKI authentication information) to write or modify partitions 704 and/or 706.

Further, Host Application Partition and its illustrative sub-partitions (e.g., 708, 710, 712) can only allow selective access to these particular partitions. For example, partition 708—third party trusted code—can allow entities to read the contents of partition 708 once an after boot state has been ascertained, and can allow entities that proffer appropriate authentication credentials write access, partition 710—secure user data (e.g., encrypted)—can allow read and write access to those entities that supply appropriate authentication credentials associated therewith, and partition 712—plain user data and suspicious code—can allow read and write access without necessity of entities providing authentication credentials.

Additionally, the High Security Partition and associated partitions (e.g., 714, 716) can only allow read access to a very select and restrictive group of entities, such as the memory 104 itself, indicating that these are the most secure partitions and that these partitions 714, 716 cannot be accessed (e.g., read) without the counter tamper component 106 or other component (not shown) that can create the respective partitions 714, 716. However, while the High Security Partition and associated partitions 714, 716 can confine read access to such partitions 714, 716 to a select and restrictive group, data can be written to these partitions 714, 716 if proper authentication credentials are provided by an entity.

It is to be appreciated that system 700 is but one example of a partitioning system that can facilitate securing data in a memory (e.g., 104), and the subject innovation is not so limited. The subject innovation contemplates that the memory can remain as one partition or can be sectioned into virtually any desirable number of partitions that can each be associated with a respective level of security to be provided to data stored therein and respective protocols regarding access to data stored in such partitions.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 8-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
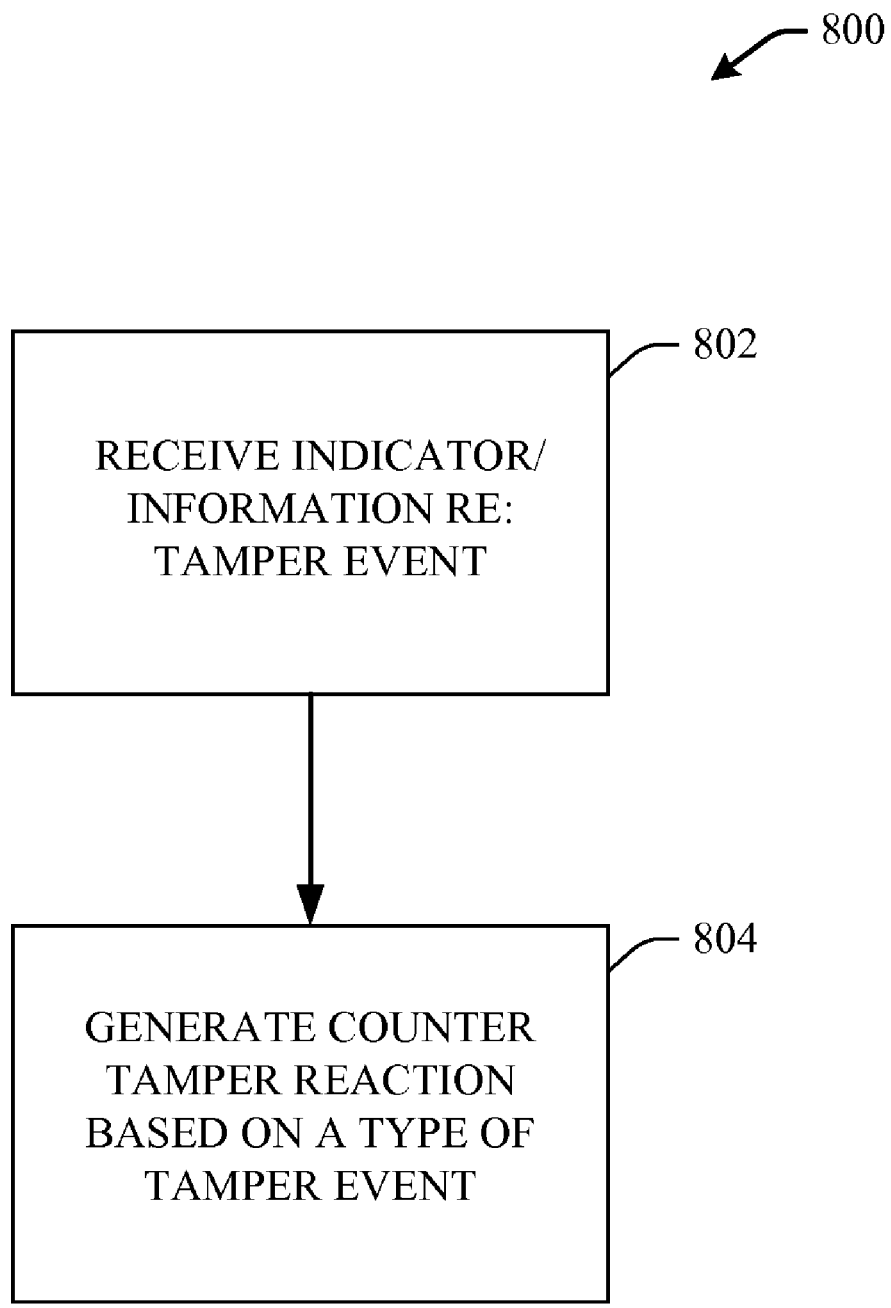
FIG. 8 illustrates a methodology that facilitates securing data in accordance with an aspect of the disclosed subject matter.

Referring to FIG. 8, illustrated is a methodology 800 that can facilitate securing data in a memory from tampering in accordance with an aspect of the disclosed subject matter. At 802, an indication that a tamper event(s) (e.g., tamper attack, attempt to tamper) has occurred can be detected and/or received. In one aspect, a counter tamper component (e.g., 106) can detect and/or receive information that can indicate that a tamper event has occurred. The indication can include, for example, invalid attempt(s) to access the memory (e.g., 104) by providing authentication information, disruption of a check circuit (e.g., mesh circuit), a switch being thrown during an attempt to remove the memory module (e.g., 102) from a PCB, path breakage between the memory module and associated circuitry/sensing device, etc.

At 804, a counter tamper reaction can be generated based in part on the type of tamper event detected or encountered. In accordance with an aspect, the counter temper reaction can be providing evidence of a tamper attack. For example, if a tamper attack relates to invalid authentication information being provided to an authentication component (e.g., 206) and/or tamper evident component (e.g., 306), the tamper evident component can facilitate changing the color state of the memory module to provide evidence to the user (e.g., owner) and/or other entities that a tamper attack has occurred. In another aspect, the memory module can resist a tamper attack. For example, if an attacker attempts to break open the memory module, the memory module and/or memory contained therein can be constructed of a material that can fracture into multiple pieces and can render the memory inoperable and data stored therein inaccessible. In accordance with yet another aspect, the counter tamper component 106 can provide a response to a tamper attack. For instance, a mesh circuit can be placed between the memory module and PCB a check signal (e.g., voltage) can be supplied to the mesh circuit. If an attacker attempts to remove the memory module from the PCB, the check signal can be disrupted or disconnected and the counter tamper component can detect such disruption/disconnection and determine that a tamper attack has occurred. The tamper response component (e.g., 312) can provide a response to such attack by erasing the data, or a portion thereof, stored in the memory, and/or can facilitate causing memory components and/or circuitry to meld together such that the memory can be inoperable and/or inaccessible. At this point, methodology 800 can end.

Figure 9:
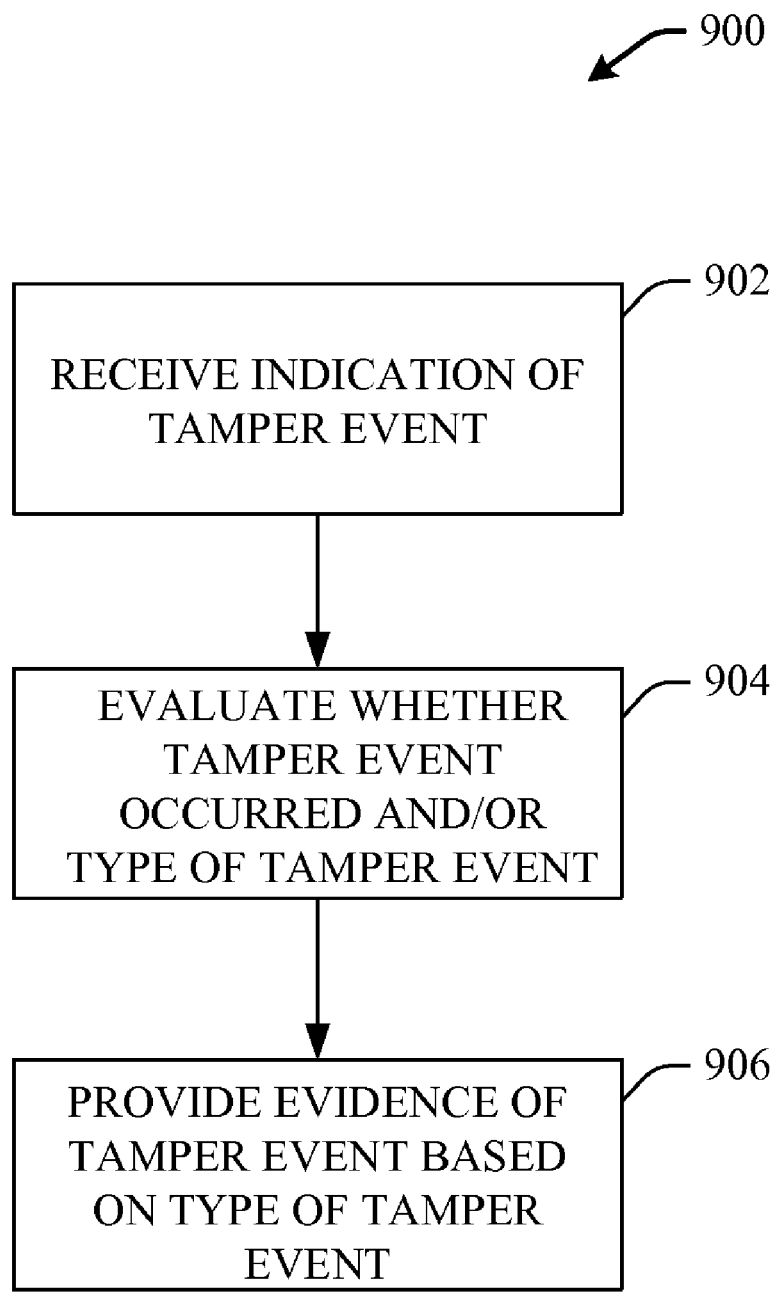
FIG. 9 illustrates a methodology that can provide evidence of tampering to facilitate securing data associated with a memory in accordance with an aspect of the disclosed subject matter.

FIG. 9 depicts a methodology 900 that can facilitate securing data associated with a memory device from tampering in accordance with an aspect of the disclosed subject matter. At 902, information that can indicate that a tamper event (e.g., tamper attack, attempt to tamper) has occurred can be received. In one aspect, a counter tamper component (e.g., 106) can receive information that a tamper event has occurred in relation to a memory module (e.g., 102) or memory (e.g., 104) associated therewith. In one aspect, the memory module can be encased in a shroud that can be composed of a material that can provide evidence of a tampering event. For example, the material can be a sticker or seal that can be placed on the surface of the memory module, plastic and/or brittle material that can fracture if there is an attempt to open the casing of the memory module and/or memory, and/or ductile material that can become deformed if there is an attempt to break open the casing of the memory module. A breaking of the sticker or seal, a fracturing of the memory module and/or memory, and/or deformation of the memory module can indicate (e.g., provide evidence) that a tamper event has occurred. In another aspect, the memory module can be constructed of a material that can change a color state to provide evidence of a tamper event, such as, for example, where an entity provides invalid authentication credentials a predetermined number of times (e.g., predetermined number of consecutive times) in order to access a memory within a memory module and is denied access to the memory. In still another aspect, a switch can be employed in combination with the casing of the memory module, and if the casing of the memory module is opened or fractured, the switch can be thrown, which can provide an indication that a tamper event has occurred.

At 904, the information associated with the indication of a tampering event can be evaluated. In one aspect, an evaluation component (e.g., 304) that can be part of the counter tamper component (e.g., 106) can analyze and evaluate such information and can determine whether a tamper event has occurred and/or can determine the type of tamper event (e.g., invalid attempt(s) to authenticate with regard to the memory, disruption of a check voltage associated with a mesh circuit, thrown switch related to casing of the memory module, etc.) that has occurred.

At 906, evidence of tampering can be provided based in part on the type of tamper event. In accordance with one aspect, a tamper evident component can provide evidence of a tamper event(s) based in part on the type of tamper event encountered by the memory module and/or memory. In one aspect, if a predetermined number of invalid attempts are made to authenticate to access the memory, the tamper evident component can determine that a tamper event has occurred and can provide evidence of such tampering, for example, by facilitating a change in the color state of the casing of the memory module, where such color change can be perceived by the user (e.g., owner) and/or other entities as evidence of tampering with the memory module. In another aspect, if the memory module is constructed with a seal or sticker contained thereon, and the tamper event relates to opening or attempting to open the memory module, the seal or sticker can tear and/or become deformed such that the tear or deformation can be perceived by the user (e.g., owner) and/or other entities as evidence of tampering with the memory module.

In yet another aspect, if the memory module is constructed of a material that is plastic and/or brittle, and the tamper event relates to opening or attempting to open the memory module, the casing of the memory module can fracture or break into multiple pieces such that the fracture or breaks (e.g., broken pieces) can be perceived by the user and/or other entities as evidence of tampering with the memory module. In accordance with another aspect, if the memory module is constructed of a ductile material, and the tamper event relates to opening or attempting to open the memory module, the ductile material can become deformed such that the deformation cannot be reversed and can be perceived by the user (e.g., owner) and/or other entities as evidence of tampering with the memory module. At this point, methodology 900 can end.

Figure 10:
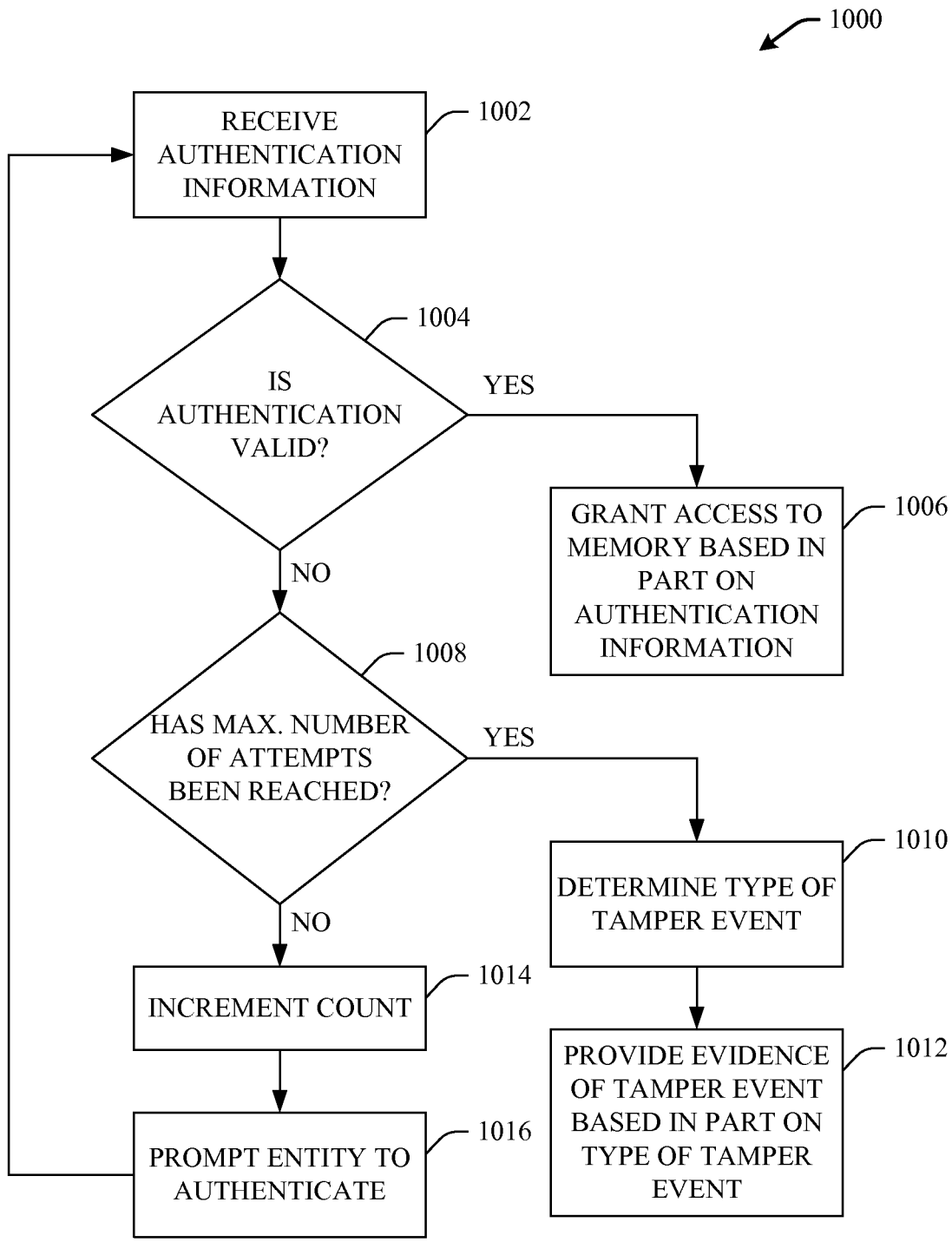
FIG. 10 depicts a methodology that can provide evidence of tampering to facilitate securing data associated with a memory in accordance with another aspect of the disclosed subject matter.

Turning to FIG. 10, depicted is a methodology 1000 that can provide evidence of tamper attacks to facilitate securing data associated with a memory from tampering in accordance with the disclosed subject matter. At 1002, authentication credential information can be received. For example, an authentication component (e.g., 206) and/or a counter tamper component (e.g., 106) can receive authentication credential information. Such information can be in the form of a password, pass phrase, PIN, biometric information, or other information that can be utilized to determine whether the entity providing such information can be granted access to data in the memory and/or the level of access rights that can be granted to the entity. In one aspect, the authentication credential information can be provided, for example, via an authentication interface component (e.g., 208).

At 1004, a determination can be made as to whether the authentication credential information is valid. If the authentication credential information is determined to be valid, at 1006, access can be granted to the entity based in part of the authentication credential information. In one aspect, the level of access rights granted to the entity can be based on the entity, the authentication credentials provided, and/or other criteria associated with the memory and/or the data stored therein.

If, at 1004, it is determined that the authentication credential information is not valid, at 1008, a determination can be made regarding whether a predetermined maximum number of attempts to authenticate has been reached. For example, an aggregation component (e.g., 302) and/or evaluation component (e.g., 304) can track the number of attempts (e.g., number of consecutive attempts) to authenticate in order to access the memory. If a predetermined number of invalid authentication attempts has been reached, at 1010, it can be determined that a tamper event has occurred. For example, the evaluation component can determine that a tamper event has occurred if the maximum number of attempts to authenticate to access the memory has been reached without success.

At 1012, evidence associated with the tamper event can be provided, where the evidence provided and/or reaction to the tamper event can be based in part on the type of tamper event(s) that occurred. In one aspect, the tamper evident component (e.g., 306) can facilitate changing the color state of the memory module as a reaction to a tamper event related to invalid authentication in order to provide evidence of tampering with regard to the memory. As a memory typically can be contained within an electronic device (e.g., cellular phone, PDA, etc.), the electronic device can include a window component that can be transparent, or substantially transparent, and can positioned in relation to the memory module and memory contained therein so that a user and/or other entities can visually perceive the change of color state to the memory module that can be evidence of a tampering event. In accordance with another aspect, the tamper evident component can provide an audio signal and/or other sensory signal (e.g., vibrations) that can provide evidence of tampering, and such audio signal and/or other sensory signal can continue until suspended as a result of proper authentication information being presented that can reset the memory module and/or can continue for a predetermined period of time, where the audio or sensory signal can cease to facilitate conserving power. The color change of the memory module can remain until reset to the original, untampered state as a result of proper authentication credentials being presented to the authentication component.

Turning back to reference numeral 1008, if it is determined that the maximum number of authentication attempts has not been reached, at 1014, the count relating to the number of authentication attempts (e.g., consecutive authentication attempts) can be incremented by one. For example, a counter associated with the tamper evident component can count and track the number of authentication attempts and can be incremented by one. At 1016, a prompt to provide authentication credentials can be provided, for example, to an entity. In one aspect, the prompt can be provided to a display component (e.g., 404) associated with the memory module and/or electronic device that can be associated therewith. At this point, methodology 1000 can return to reference numeral 1002, where authentication credential information can be received, and methodology 1000 can proceed from that point, for example, until proper authentication information has be received and/or a predetermined maximum number of unsuccessful attempts to authenticate has been reached. At this point, methodology 1000 can end.

Figure 11:
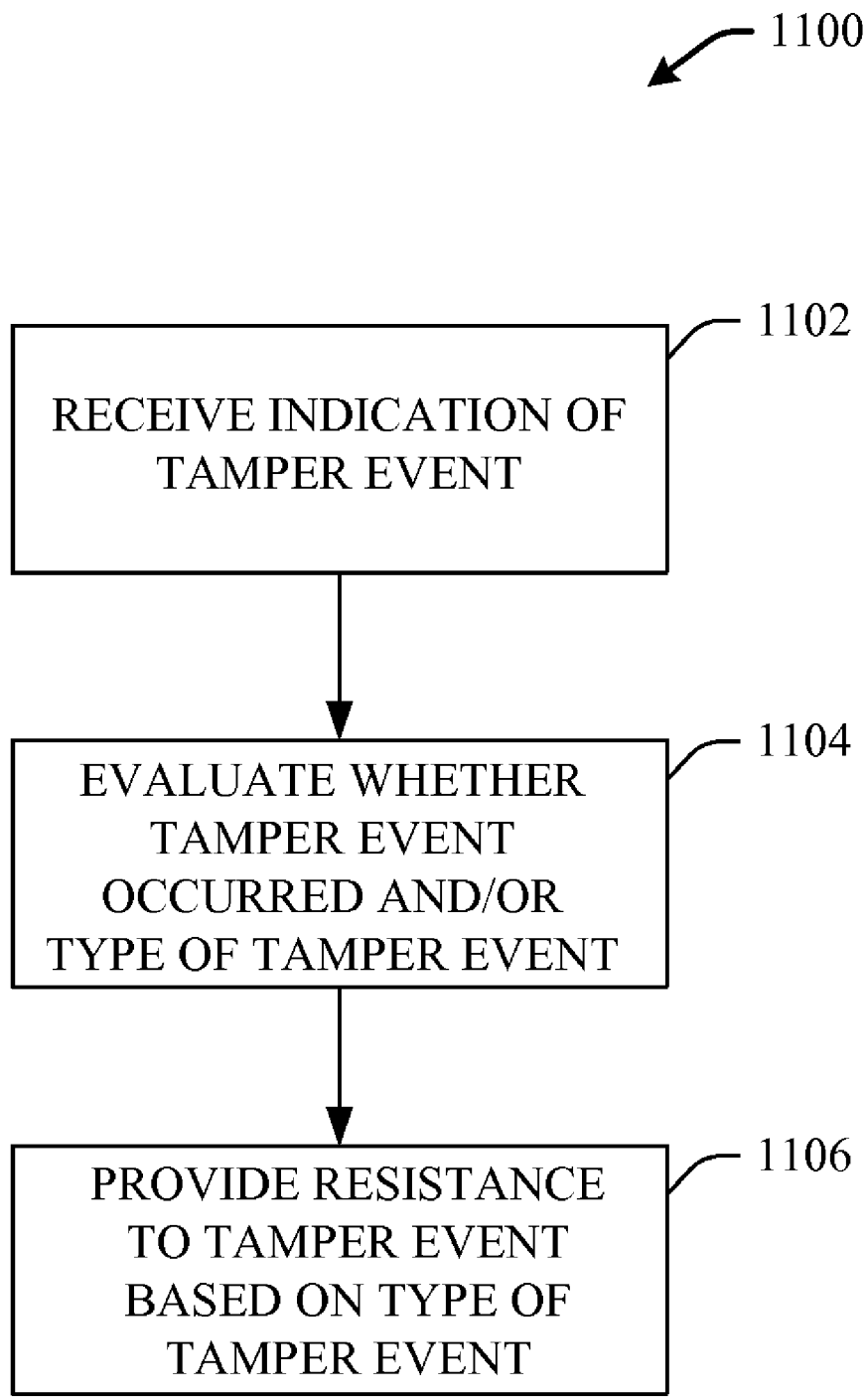
FIG. 11 depicts a methodology that can resist tamper attacks to facilitate securing data associated with a memory in accordance with an aspect of the disclosed subject matter.

Referring to FIG. 11, illustrated is a methodology 1100 that can resist tamper attacks to facilitate securing data associated with a memory from tampering in accordance with an aspect of the disclosed subject matter. At 1102, information that can indicate that a tamper event (e.g., tamper attack, attempt to tamper) has occurred can be received. In one aspect, a counter tamper component (e.g., 106) can receive information that a tamper event has occurred in relation to a memory module (e.g., 102) or memory (e.g., 104) associated therewith. In one aspect, the memory module can be encased in a casing that can be composed of a material that can resist tampering. For example, the material can be a plastic and/or brittle material that can resist opening and can break and/or fracture if the casing of the memory module is opened.

At 1104, an evaluation can be made regarding whether a tamper event has occurred and, if so, the type of tamper event that has occurred, for example, to determine whether the tamper event can be countered via a resistance to tampering. At 1106, a resistance to the tampering event can be provided, where, for example, the tamper event is a type for which a resistance to tampering can be desirable. In one aspect, in reaction to tampering, such as where an entity attempts to open the memory module and/or memory contained therein, the memory module and/or memory can fracture into multiple pieces such that the memory can be rendered inoperable and/or the data stored therein can be rendered inaccessible. At this point, methodology 1100 can end.

While such fracturing of the memory casing due to an attempt to open the casing of the memory module and/or memory casing can result in the data stored in the memory being inaccessible to a user (e.g., owner) who can be authorized to access such information, it can be determined that the data stored in the memory can be of such a sensitive nature that the benefit of rendering the data stored in the memory inaccessible to potential attackers can outweigh the loss of access to the data for an authorized user.

Figure 12:
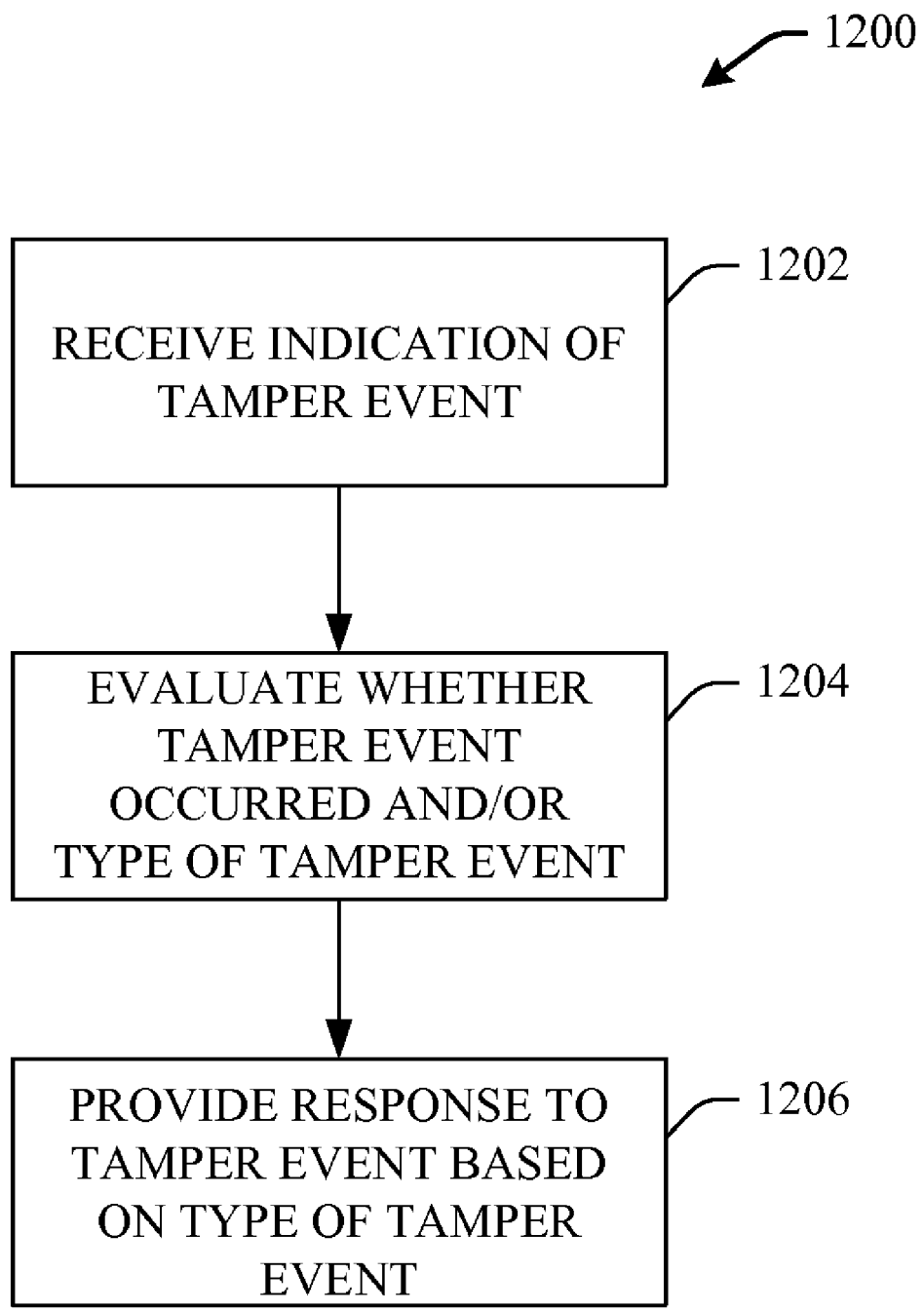
FIG. 12 illustrates a methodology that can provide a response to a tamper attack to facilitate securing data associated with a memory in accordance with an aspect of the disclosed subject matter.

FIG. 12 depicts a methodology 1200 that can provide a response to a tamper attack(s) to facilitate securing data associated with a memory from tampering in accordance with an aspect of the disclosed subject matter. At 1202, information that can indicate that a tamper event (e.g., tamper attack, attempt to tamper) has occurred can be received. In one aspect, a counter tamper component (e.g., 106) can receive information that a tamper event has occurred in relation to a memory module (e.g., 102) or memory (e.g., 104) associated therewith.

In one aspect, the counter tamper component can employ a mesh circuit that can be situated between and/or can be connected to a memory module (e.g., 102) (and memory (e.g., 104) therein) and the PCB to which the memory module and memory can be electrically connected. A check signal (e.g., voltage) can be provided to the mesh circuit, and a disruption (e.g., variance in signal level and/or strength) and/or disconnection of the signal can indicate that a tamper event has occurred.

In accordance with another aspect, a switch(es) can be utilized and placed between adjacent portions of the casing of the memory module and/or between the memory module and the PCB or a socket that can be placed therebetween. The switch can be in a depressed mode while in an untampered state. If the casing of the memory module is opened and/or the memory module is removed from the PCB or socket, the switch can be activated such that the switch is no longer depressed and can change a state as a result, which can provide an indication that a tamper event has occurred.

At 1204, an evaluation can be made regarding whether a tamper event has occurred and, if so, the type of tamper event that has occurred, for example, to determine whether the tamper event can be countered by initiating a response to the tampering. At 1206, a response to the tampering event can be provided, where, for example, the tamper event is a type for which a response to tampering can be desirable. In one aspect, in reaction to the tampering, such as where a disruption or disconnection of a check signal associated with a mesh circuit is detected, a tamper response component (e.g., 312) can provide a response to such tampering by erasing data, or a portion thereof, stored in the memory, as desired, so that an unauthorized entity (e.g., attacker) cannot access or view such data. In another aspect, in reaction to tampering, such as where a switch employed in the casing of the memory module is thrown to a different state as a result of the memory module being removed from the PCB and/or the casing of the memory module being opened or disrupted, the tamper response component can provide a response such as by erasing data, or a portion thereof, stored in the memory, as desired, so that an unauthorized entity cannot access or view such data.

In still another aspect, the response to such tamper attacks associated with the mesh circuit and/or switch(es) can be a catastrophic failure and/or graceful failure of one or more components (e.g., transistors, conductive paths, etc.) associated with the memory so as to render the memory inoperable and inaccessible to an entity(ies). For example, one or more components associated with the memory can be melded together to cause the memory to be unusable and the data stored therein inaccessible. At this point, methodology 1200 can end.

Figure 13:
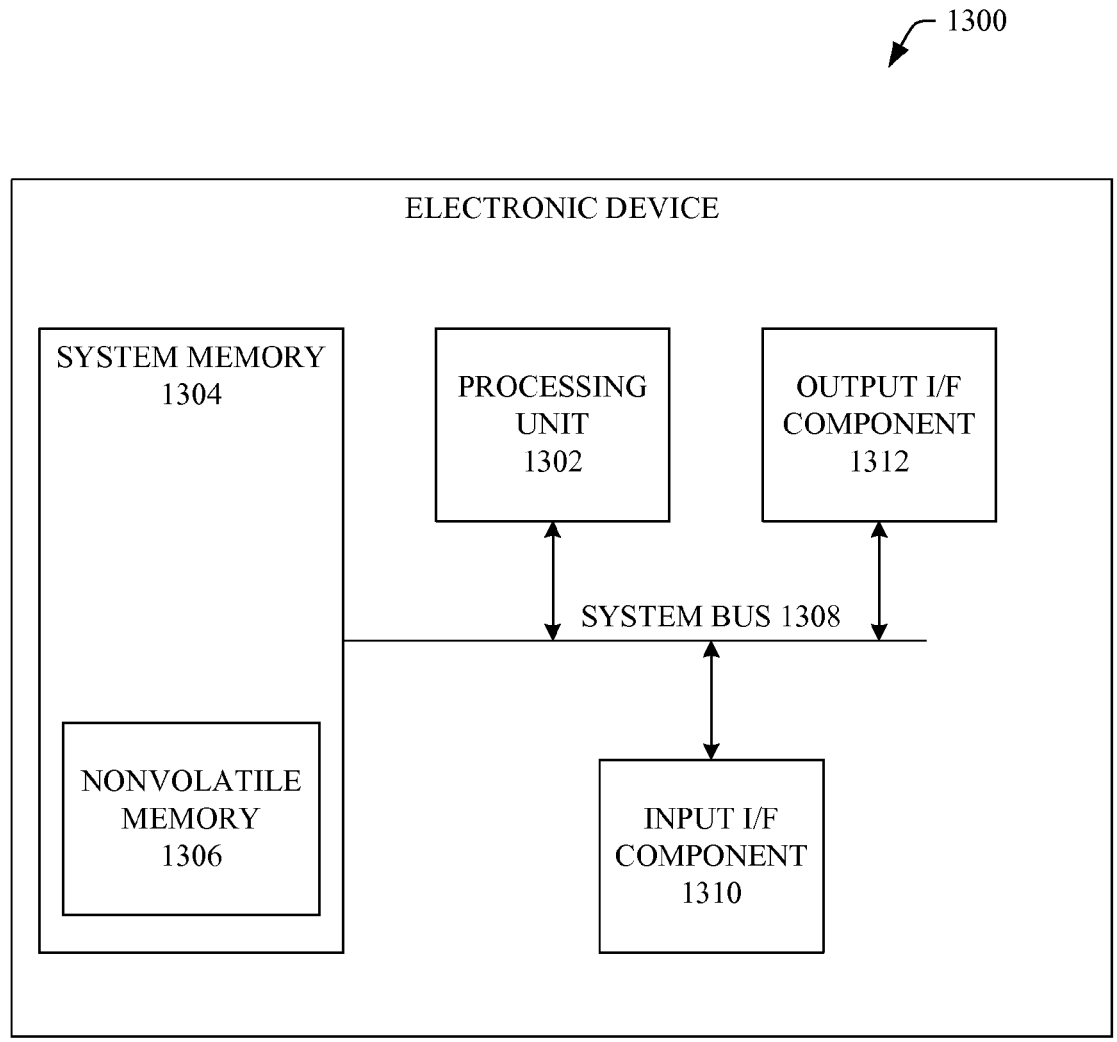
FIG. 13 is a block diagram of an exemplary electronic device that can utilize a memory device(s) in accordance with an aspect of the disclosed subject matter.

Referring to FIG. 13, illustrated is a block diagram of an exemplary, non-limiting electronic device 1300 that can incorporate system 100, system 200, system 250, system 300, system 400, system 500, and/or system 600, or a portion(s) thereof. The electronic device can include, but is not limited to, a computer, a laptop computer, network equipment (e.g. routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system (e.g., global position satellite (GPS) system), secure memory devices with computational capabilities, devices with tamper-resistant chips, an electronic device associated with an industrial control system, an embedded computer in a machine (e.g., an airplane, a copier, a motor vehicle, a microwave oven), and the like.

Components of the electronic device 1300 can include, but are not limited to, a processing unit 1302, a system memory 1304 (with nonvolatile memory 1306), and a system bus 1308 that can couple various system components including the system memory 1304 to the processing unit 1302. The system bus 1308 can be any of several types of bus structures including a memory bus or memory controller, a peripheral bus, or a local bus using any of a variety of bus architectures.

Electronic device 1300 can typically include a variety of computer readable media. Computer readable media can be any available media that can be accessed by the electronic device 1300. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1306 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1300. Communication media typically embodies computer readable instructions, data structures, program modules or other data in a modulated data signal such as a carrier wave or other transport mechanism and includes any information delivery media.

The system memory 1304 can include computer storage media in the form of volatile and/or nonvolatile memory 1306 (e.g., memory 104). A basic input/output system (BIOS), containing the basic routines that help to transfer information between elements within electronic device 1300, such as during start-up, can be stored in memory 1304. Memory 1304 typically also contains data and/or program modules that can be immediately accessible to and/or presently be operated on by processing unit 1302. By way of example, and not limitation, system memory 1304 can also include an operating system, application programs, other program modules, and program data.

The nonvolatile memory 1306 can be removable or non-removable. For example, the nonvolatile memory 1306 can be in the form of a removable memory card or a USB flash drive. In accordance with one aspect, the nonvolatile memory 1306 can include flash memory (e.g., single-bit flash memory, multi-bit flash memory), ROM, PROM, EPROM, EEPROM, or NVRAM (e.g., FeRAM), or a combination thereof, for example. Further, the flash memory can be comprised of NOR flash memory and/or NAND flash memory.

A user can enter commands and information into the electronic device 1300 through input devices (not shown) such as a keypad, microphone, tablet or touch screen although other input devices can also be utilized. These and other input devices can be connected to the processing unit 1302 through input interface component 1310 that can be connected to the system bus 1308. Other interface and bus structures, such as a parallel port, game port or a universal serial bus (USB) can also be utilized. A graphics subsystem (not shown) can also be connected to the system bus 1308. A display device (not shown) can be also connected to the system bus 1308 via an interface, such as output interface component 1312, which can in turn communicate with video memory. In addition to a display, the electronic device 1300 can also include other peripheral output devices such as speakers (not shown), which can be connected through output interface component 1312.

As used herein, terms "component," "system," "interface", and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The word "exemplary" is used herein to mean serving as an example, instance, or illustration. Any aspect or design described herein as "exemplary" is not necessarily to be construed as preferred or advantageous over the other aspects or designs.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. An electronic device that facilitates data security associated with a memory, comprising:
   the memory is configured to be contained within the electronic device and comprises a plurality of memory locations to facilitate storage of data, wherein the memory is further configured to provide at least one indicator in response to at least one tamper attack associated with the memory;
   a window component associated with a housing of the electronic device, wherein the window component is configured to facilitate detection of the at least one indicator to facilitate data security associated with the memory; and
   a counter tamper component that is associated with the memory and is configured to react to the at least one tamper attack to facilitate data security associated with the memory based at least in part on a type of tamper attack, wherein, when the at least one tamper attack relates to authentication of an entity attempting to access the memory, the counter tamper component is further configured to facilitate provision of the at least one indicator, wherein the at least one indicator comprises at least one of change of a color state of at least one of a portion of a memory housing that contains the memory or change of a color state of an indicator component contained within the memory housing such that the at least one indicator is perceivable via the window component to facilitate detection of the at least one tamper attack.

2. The electronic device of claim 1, further comprising:
   an authentication component is configured to receive an authentication credential, determine that at least one of the authentication credential is valid or the authentication credential is invalid, and grant a subset of access rights associated with the memory if the authentication credential is valid, wherein the subset of access rights is based at least in part on the authentication credential.

3. The electronic device of claim 2, wherein the authentication component is further configured to evaluate information associated with an invalid authentication credential, determine that at least one of a predetermined maximum number of attempts to authenticate is reached or the predetermined maximum number of attempts to authenticate is not reached, increment a count associated with the attempts to authenticate if the predetermined maximum number of attempts to authenticate is not reached, prompt the entity to provide another authentication credential if the predetermined maximum number of attempts to authenticate is not reached, and determine that at least one of the at least one tamper event occurred or a tamper event did not occur based at least in part on the count.

4. The electronic device of claim 1, wherein at least one of the memory housing comprises a material that changes its color state or the indicator component comprises a light source that changes its color state, in response to the at least one tamper attack based at least in part on the type of tamper attack.

5. The electronic device of claim 1, the type of tamper attack is at least one of an access of the memory associated with invalid authentication information, a removal of the memory from a printed circuit board, a fracture of a casing associated with the memory, a side-channel attack, or a fault attack.

6. A system that facilitates security of data associated with a memory, comprising:
the memory that is configured to include a plurality of memory locations to facilitate storage of data;
a counter tamper component that is configured to be associated with the memory and is configured to react to at least one tamper attack associated with the memory to facilitate security of data associated with the memory based at least in part on a type of tamper attack, wherein, when the at least one tamper attack relates to authentication of an entity attempting to access the memory, the counter tamper component is further configured to provide at least one indicator in reaction to the at least one tamper attack, wherein the at least one indicator comprises at least one of change of a color state of at least one of a portion of a memory module that contains the memory or change of a color state of an indicator component associated with the memory module such that the at least one indicator is perceivable via a window component associated with an electronic device in which the memory module is configured to reside to facilitate detection of the at least one tamper attack.

7. The system of claim 6, the type of tamper attack is at least one of an access of the memory associated with invalid authentication information, a removal of the memory from a printed circuit board, a fracture of a casing associated with the memory, a side-channel attack, or a fault attack.

8. The system of claim 6, the counter tamper component is further configured to provide at least one of evidence of, resistance to, or a response to the at least one tamper attack, in reaction to the at least one tamper attack.

9. The system of claim 6, further comprising the memory module that is configured to contain at least the memory.

10. The system of claim 9, the counter tamper component is further configured to utilize a mesh circuit associated with the memory module and a printed circuit board, and is further configured to facilitate application of a predetermined voltage level to the mesh circuit, wherein the counter tamper component is further configured to determine that the at least one tamper attack has occurred based at least in part on variance from the predetermined voltage level and is further configured to respond to the at least one tamper attack by at least one of an erasure of at least a portion of data stored in the memory, a catastrophic failure of the memory, or a graceful failure of the memory.

11. The system of claim 9, a casing of the memory module is comprised of a material that changes its color state based at least in part on the type of tamper attack, the counter tamper component is further configured to detect an unauthorized attempt to access the memory and facilitate the change of the color state of the material to indicate that the at least one tamper attack has occurred.

12. The system of claim 11, further comprising the window component, wherein the memory module is configured to be contained in a casing associated with the electronic device and the window component is configured to be positioned on a face of the casing associated with the electronic device relative to the position of the memory module within the casing associated with the electronic device such that the casing of the memory module is visible to at least one user via a transparent portion of the window component that enables the at least one user to perceive the casing of the memory module.

13. The system of claim 9, at least one of a casing of the memory module or a casing of the memory is formed of a brittle material that fractures into multiple pieces in response to being opened and renders data stored in the memory inaccessible.

14. The system of claim 9, the at least one tamper attack comprising opening a casing of the memory module, the counter tamper component is further configured to employ a switch that is associated with the casing of the memory module, wherein the switch is configured to change state when the casing of the memory module is opened, the counter tamper component is further configured to detect the change of state of the switch, identify such change of state as the at least one tamper attack, and respond to the at least one tamper attack by at least one of an erasure of at least a portion of data stored in the memory, a catastrophic failure of the memory, or a graceful failure of the memory.

15. The system of claim 9, further comprising:
an authentication component that is configured to facilitate verification of an authentication credential associated with the entity to control access to the memory based at least in part on a valid authentication credential; and
a cryptographic component that is configured to perform data encryption and decryption, wherein the at least one tamper attack comprising at least one of a side-channel attack or a fault attack, wherein the counter tamper component is further configured to employ a shield that is placed inside the casing of the memory module and facilitate a reduction of emission of information associated with the data encryption or the data decryption to outside of the casing of the memory module to facilitate resistance of the at least one tamper attack, wherein the side-channel attack is associated with at least one of information associated with electromagnetic radiation, power consumption, or radio frequency characteristics, associated with at least one of the memory or the cryptographic component.

16. The system of claim 6, the memory comprising non-volatile memory.

17. An electronic device comprising the system of claim 6.

18. The electronic device of claim 17, wherein the electronic device comprises at least one of a computer, a laptop computer, network equipment, a media player, a media recorder, a television, a smart card, a phone, a cellular phone, a smart phone, an electronic organizer, a personal digital assistant, a portable email reader, a digital camera, an electronic game, an electronic device associated with digital rights management, a Personal Computer Memory Card International Association (PCMCIA) card, a trusted platform module (TPM), a Hardware Security Module (HSM), a set-top box, a digital video recorder, a gaming console, a navigation device, a secure memory device with computational capabilities, a device with at least one tamper-resistant chip, an electronic device associated with an industrial control system, or an embedded computer in a machine, wherein the machine comprises one of an airplane, a copier, a motor vehicle, or a microwave oven.

19. A method that facilitates securing data associated with a memory from tampering, comprising:
receiving information relating to at least one tamper event associated with the memory; and reacting to the at least one tamper event based at least in part on type of tamper event to facilitate securing the data associated with the memory, wherein the at least one tamper event relates to authentication of an entity attempting to access the memory, and wherein the reacting to the at least one tamper event further comprising at least providing evidence of the at least one tamper event when it is determined that the at least one tamper event occurred, the evidence associated with the at least one tamper event comprising at least one of changing a color state associated with a casing that contains the memory or deforming the casing that contains the memory.

20. The method of claim 19, the reacting to the at least one tamper event based at least in part on type of tamper event, further comprising at least one of providing evidence associated with the at least tamper event, resisting the at least one tamper event, or responding to the at least one tamper event.

21. The method of claim 20, further comprising:
receiving information associated with the at least one tamper event comprising at least one of attempting to gain unauthorized access to the memory, opening a casing that contains the memory, or breaking a seal associated with the casing that contains the memory;
evaluating the received information;
determining that at least one of the at least one tamper event occurred or a tamper event did not occur; and
providing evidence associated with the at least one tamper event if it is determined that the at least one tamper event occurred, the evidence associated with the at least one tamper event comprising at least one of changing a color state associated with a casing that contains the memory or deforming the casing that contains the memory.

22. The method of claim 20, further comprising:
receiving an authentication credential;
determining that at least one of the authentication credential is valid or the authentication credential is invalid;
granting a subset of access rights associated with the memory if the authentication credential is valid, the subset of access rights is based in part on the authentication credential;
evaluating information associated with an invalid authentication credential;
determining that at least one of a predetermined maximum number of attempts to authenticate is reached or the predetermined maximum number of attempts to authenticate is not reached;
incrementing a count associated with the attempts to authenticate if the predetermined maximum number of attempts to authenticate is not reached;
prompting the entity to provide an authentication credential if the predetermined maximum number of attempts to authenticate is not reached; and
determining that at least one of the at least one tamper event occurred or a tamper event did not occur based at least in part on the count.

23. The method of claim 20, further comprising:
receiving information associated with the at least one tamper event comprising attempting to open a casing that contains the memory;
evaluating the received information;
determining at least one of the at least one tamper event occurred or a tamper event did not occur; and
resisting the at least one tamper event if it is determined that the at least one tamper event occurred, wherein resisting the at least one tamper event comprises fracturing the casing that contains the memory into multiple pieces and rendering the data stored in the memory inaccessible.

24. The method of claim 20, further comprising:
receiving information associated with the at least one tamper event comprising at least one of changing a state of a switch associated with a casing that contains the memory or disrupting a voltage signal associated with a mesh circuit that is associated with the memory;
evaluating the received information;
determining that at least one of the at least one tamper event occurred or a tamper event did not occur; and
responding to the at least one tamper event if it is determined that the at least one tamper event occurred, the responding to the at least one tamper event comprising at least one of erasing at least a portion of data stored in the memory, generating a catastrophic failure of the memory, or generating a graceful failure of the memory.

25. A system that facilitates securing data associated with a memory from tampering, comprising:
means for storing data in the memory;
means for at least one of providing evidence of a tamper attack, resisting a tamper attack, or responding to a tamper attack, based at least in part on type of tamper attack to facilitate securing the data associated with the memory; and
means for changing a color state associated with a memory casing that includes the memory to facilitate providing evidence of the tamper attack based at least in part on the type of tamper attack, wherein, in response to the tamper attack, the means for changing a color state at least one of changes a color state of at least a portion of a surface of the memory casing or changes a color state of an indicator component contained associated with the memory casing, wherein at least one of the change in the color state of the at least a portion of the surface of the memory casing or the change in the color state of the indicator component is perceivable via a window component associated with an electronic device in which the memory resides to facilitate detection of the tamper attack.

26. The system of claim 25, further comprising:
means for authenticating at least one user;
means for providing a transparent view into an electronic device that contains the memory casing that includes the memory to facilitate perceiving a change in the color state by at least one entity;
means for supplying power to facilitate securing the data associated with the memory; and
means for evaluating information associated with a tamper attack.

* * * * *